US012148348B2

(12) United States Patent
Kim et al.

(10) Patent No.: US 12,148,348 B2
(45) Date of Patent: Nov. 19, 2024

(54) DATA DRIVING CIRCUIT, DISPLAY DEVICE INCLUDING THE SAME, AND METHOD OF DRIVING THE SAME

(71) Applicant: Samsung Display Co., Ltd., Yongin-Si (KR)

(72) Inventors: Won Tae Kim, Yongin-si (KR); Bo Yeon Kim, Yongin-si (KR); Jae Han Lee, Yongin-si (KR)

(73) Assignee: Samsung Display Co., Ltd., Yongin -Si (KR)

(*) Notice: Subject to any disclaimer, the term of this patent is extended or adjusted under 35 U.S.C. 154(b) by 0 days.

(21) Appl. No.: 18/236,426

(22) Filed: Aug. 22, 2023

(65) Prior Publication Data

US 2024/0282235 A1 Aug. 22, 2024

(30) Foreign Application Priority Data

Feb. 17, 2023 (KR) ........................ 10-2023-0021692

(51) Int. Cl.
*G09G 3/20* (2006.01)
*G09G 3/3208* (2016.01)

(52) U.S. Cl.
CPC ......... *G09G 3/2074* (2013.01); *G09G 3/3208* (2013.01); *G09G 2300/0819* (2013.01); *G09G 2300/0823* (2013.01); *G09G 2300/0842* (2013.01); *G09G 2310/0286* (2013.01); *G09G 2320/0233* (2013.01); *G09G 2354/00* (2013.01)

(58) Field of Classification Search
CPC ............... G09G 3/2074; G09G 3/3208; G09G 2300/0819; G09G 2300/0823; G09G 2300/0842; G09G 2310/0286; G09G 2320/0233; G09G 2354/00
See application file for complete search history.

(56) References Cited

U.S. PATENT DOCUMENTS

| | | | | |
|---|---|---|---|---|
| 11,514,864 B2 | 11/2022 | Kim et al. | | |
| 2014/0267206 A1* | 9/2014 | Takani | G09G 3/3688 345/94 | |
| 2020/0410950 A1* | 12/2020 | Chen | G09G 3/3685 | |
| 2022/0020334 A1* | 1/2022 | Kim | G09G 3/3233 | |

FOREIGN PATENT DOCUMENTS

KR 10-2022-0010649 A 1/2022

* cited by examiner

*Primary Examiner* — Premal R Patel
(74) *Attorney, Agent, or Firm* — Innovation Counsel LLP

(57) ABSTRACT

A data driving circuit is disclosed that includes an amplifier and an offset control circuit. The amplifier has an offset voltage and is configured to output a data voltage reflecting the offset voltage. The offset control circuit is configured to control, in response to an input control signal, the amplifier to output the data voltage reflecting the offset voltage in a positive direction or a negative direction. The data driving circuit may enhance the display quality of a low grayscale image.

20 Claims, 19 Drawing Sheets

+R, +G, +B: Vtarget + Vos

-R, -G, -B: Vtarget - Vos

DATA DRIVING CIRCUIT, DISPLAY DEVICE INCLUDING THE SAME, AND METHOD OF DRIVING THE SAME

CROSS-REFERENCE TO RELATED APPLICATION

The present application claims priority to Korean patent application number 10-2023-0021692 filed on Feb. 17, 2023, the entire disclosure of which is incorporated herein in its entirety by reference.

BACKGROUND

Field of Invention

The present disclosure relates to a data driving circuit, a display device including the data driving circuit, and a method of driving the display device.

Description of Related Art

With the development of information technology, the importance of display devices, which are connection mediums between users and information, has been emphasized. Owing to the importance of display devices, the use of various kinds of display devices, such as liquid crystal display devices and organic light-emitting display devices, has increased.

SUMMARY

Various embodiments of the present disclosure are directed to a data driving circuit capable of enhancing the display quality of a low grayscale image, a display device including the data driving circuit, and a method of driving the display device.

An embodiment of the present disclosure may provide a data driving circuit including: an amplifier having an offset voltage, and configured to output a data voltage reflecting the offset voltage; and an offset control circuit configured to control, in response to an input control signal, the amplifier to output the data voltage reflecting the offset voltage in a positive direction or a negative direction.

The amplifier may include a non-inverting input terminal, an inverting input terminal, and an output terminal, and output the data voltage from the output terminal. The offset control circuit may include a first input terminal electrically connected to any one of the non-inverting input terminal and the inverting input terminal, and a second input terminal electrically connected to a remaining one of the non-inverting input terminal and the inverting input terminal. The second input terminal of the offset control circuit may be electrically connected to the output terminal. A terminal to be electrically connected to the first input terminal may be switched in response to the input control signal.

The data driving circuit may further include: a shift register unit including at least one shift register; a sampling latch unit configured to latch input image data in response to a signal outputted from the shift register unit; a holding latch unit configured to output the latched input image data in response to a source output enable signal; a decoder configured to receive a maximum grayscale gamma voltage and a minimum grayscale gamma voltage, and select and output a grayscale voltage corresponding to the input image data outputted from the holding latch unit; and a buffer-amplifier unit configured to receive the voltage outputted from the decoder. The buffer-amplifier unit may include the amplifier and the offset control circuit.

The grayscale voltage may be inputted to the first input terminal.

The offset control circuit may include: a first switching circuit configured to electrically connect the first input terminal and the non-inverting input terminal to each other, and electrically connect the second input terminal and the inverting input terminal to each other; and a second switching circuit configured to electrically connect the first input terminal and the inverting input terminal to each other, and electrically connect the second input terminal and the non-inverting input terminal to each other.

The first switching circuit may include: a first switching element configured to electrically connect the first input terminal and the non-inverting input terminal to each other in response to the input control signal of a first logic level; and a second switching element configured to electrically connect the second input terminal and the inverting input terminal to each other in response to the input control signal of the first logic level. The second switching circuit may include: a third switching element configured to electrically connect the first input terminal and the inverting input terminal to each other in response to the input control signal of a second logic level; and a fourth switching element configured to electrically connect the second input terminal and the non-inverting input terminal to each other in response to the input control signal of the second logic level.

The first logic level may be any one of a high logic level and a low logic level, and the second logic level may be a remaining one of the high logic level and the low logic level.

A level of the data voltage to be outputted from the amplifier may be changed depending on a level of the input control signal.

An embodiment of the present disclosure may provide a display device, including: a display panel in which a sub-pixel is disposed and a data line electrically connected to the sub-pixel and configured to be supplied with a data voltage is disposed; a timing controller configured to output input image data and an input control signal; and a data driving circuit configured to output the data voltage reflecting any one of an offset voltage of a positive direction and an offset voltage of a negative direction to a target data voltage in response to the input control signal.

A plurality of pixel rows including the sub-pixel may be disposed in the display panel. The timing controller may output the input image data aligned on each pixel row basis. The timing controller may transition a level of the input control signal on a basis of one or more of the pixel rows, and output the input control signal.

The data driving circuit may include: an amplifier including a non-inverting input terminal, an inverting input terminal, and an output terminal; and an offset control circuit configured to control a voltage to be inputted to each of the non-inverting input terminal and the inverting input terminal in response to the input control signal.

The timing controller may output input image data corresponding to a grayscale value of an image to be displayed by the sub-pixel. The offset control circuit may include: a first input terminal configured to receive a voltage generated by latching the input image data; and a second input terminal configured to receive a voltage outputted from the output terminal.

The timing controller may output an input control signal of a first logic level or a second logic level. The offset control circuit may include: a first switching circuit configured to electrically connect, in response to the input control signal of the first logic level, the first input terminal and the non-inverting input terminal to each other, and electrically connect the second input terminal and the inverting input terminal to each other; and a second switching circuit configured to electrically connect, in response to the input control signal of the second logic level, the first input terminal and the inverting input terminal to each other, and electrically connect the second input terminal and the non-inverting input terminal to each other.

The sub-pixel may include: a light emitting element; a first transistor comprising a gate electrode electrically connected to a first node, and a second electrode electrically connected to the light emitting element on a second node; a second transistor configured to switch electrical connection between the data line and the first node; a third transistor configured to switch electrical connection between the second node and a reference voltage line disposed in the display panel, and transmit a sensing voltage corresponding to a voltage of the second node to the reference voltage line; and a capacitor including a first side electrode electrically connected to the first node, and a second side electrode electrically connected to the second node.

A magnitude of current flowing through the light emitting element may vary depending on a level of the input control signal.

As a frame proceeds, the data voltage generated based on the input control signal of a first logic level and the data voltage generated based on the input control signal of a second logic level may be alternately applied to the sub-pixel.

The sensing voltage may be a saturation voltage of the first transistor. The timing controller may include an offset compensation unit configured to compensate for an offset voltage of the data driving circuit based both on a first sensing voltage according to the input control signal of the first logic level and on a second sensing voltage according to the input control signal of the second logic level.

An embodiment of the present disclosure may provide a method of driving a display device. The method may include: outputting, by the timing controller to a data driving circuit, an input control signal of a first logic level; outputting, by the data driving circuit to a sub-pixel, a data voltage reflecting an offset voltage of an amplifier in a non-inverted phase to the data line in response to the input control signal of the first logic level; outputting, by the timing controller to the data driving circuit, the input control signal of a second logic level; and outputting, by the data driving circuit to the sub-pixel, a data voltage reflecting the offset voltage of the amplifier in an inverted phase to the data line in response to the input control signal of the second logic level.

In an embodiment, outputting the data voltage reflecting the offset voltage of the amplifier in the non-inverted phase to the data line may include: electrically connecting a first input terminal configured to receive a voltage corresponding to latched input image data to a non-inverting terminal of the amplifier; and electrically connecting an output terminal of the amplifier to an inverting input terminal of the amplifier.

In an embodiment, outputting the data voltage reflecting the offset voltage of the amplifier in the inverted phase to the data line may include: electrically connecting a first input terminal configured to receive a voltage corresponding to latched input image data to an inverting terminal of the amplifier; and electrically connecting an output terminal of the amplifier to a non-inverting input terminal of the amplifier.

The method may further include: applying the data voltage generated based on the input control signal of the first logic level to the sub-pixel in an N-th frame (N is an integer of 1 or more); and applying the data voltage generated based on the input control signal of the second logic level to the sub-pixel in an N+1-th frame.

The method may further include: sensing a first saturation voltage of the first transistor in the N-th frame; sensing a second saturation voltage of the first transistor in the N+1-th frame; and calculating the offset voltage of the amplifier based on the sensed first saturation voltage and the sensed second saturation voltage.

The method may further include outputting input image data reflecting an inverted offset voltage or a non-inverted offset voltage depending on a level of the input control signal.

DETAILED DESCRIPTION

Figure 1:
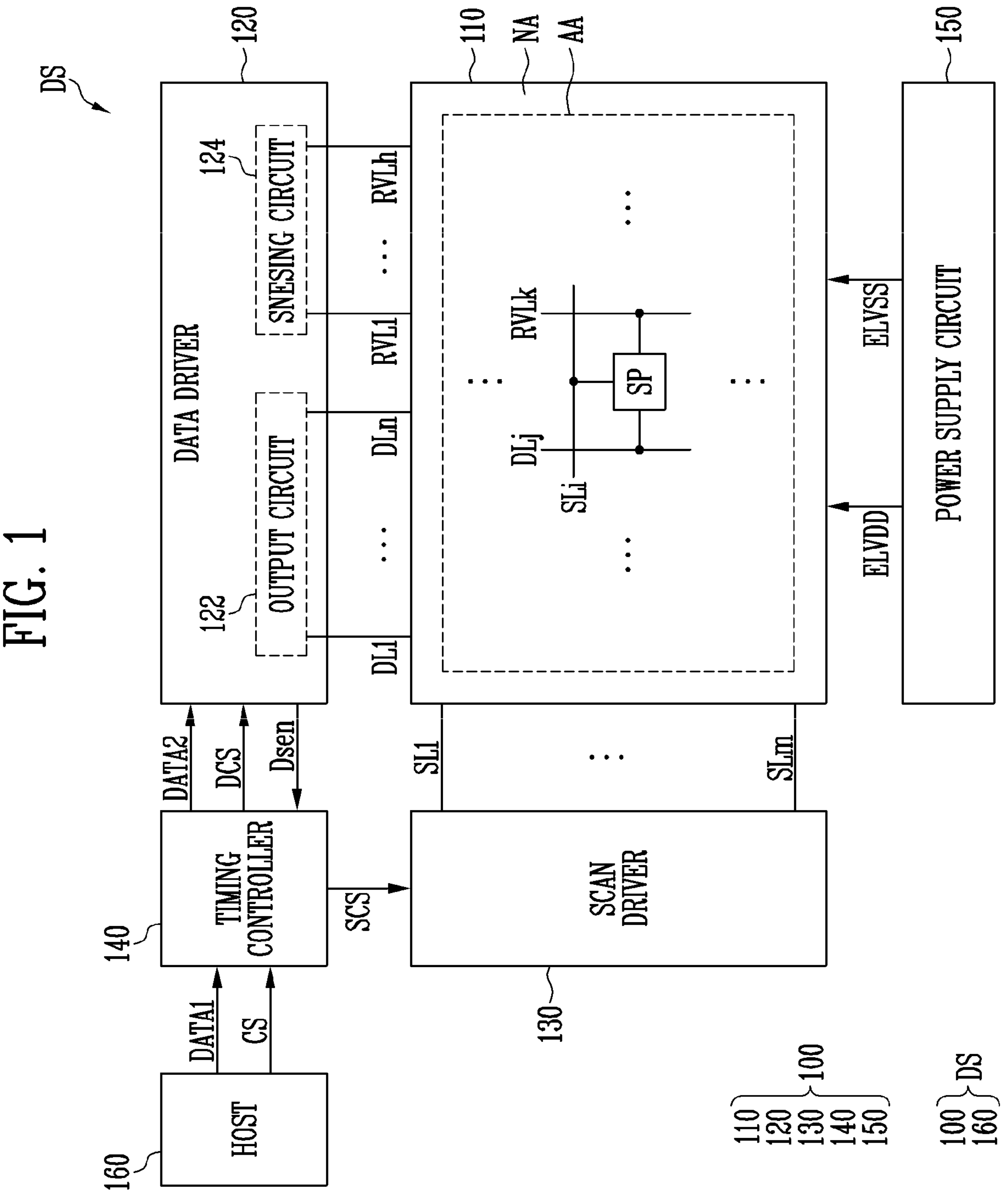
FIG. 1 is a system block diagram of a display device in accordance with embodiments of the present disclosure.

Hereinafter, embodiments of the present invention will be described in detail with reference to the attached drawings, such that those skilled in the art can easily implement the present invention. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

FIG. 1 is a system block diagram illustrating a display device 100 in accordance with embodiments of the present disclosure.

Referring to FIG. 1, the display device 100 in accordance with embodiments of the present disclosure may include a display panel 110, a data driving circuit 120 (or a data driver), a scan driving circuit 130 (or a scan driver), a timing controller 140, a power supply circuit 150, and the like.

A plurality of sub-pixels SP are disposed in the display panel 110. Electrically connected to the plurality of sub-pixels SP, a plurality of data lines DL1 to DLn (n is an integer of 2 or more), a plurality of scan lines SL1 to SLm (m is an integer of 2 or more), a plurality of reference voltage lines RVL1 to RVLh (h is an integer of 2 or more), and the like may be disposed in the display panel 110. One or more common voltage lines (not illustrated) configured to apply a common voltage (e.g., a first common voltage ELVDD, a second common voltage ELVSS, or the like) to the plurality of sub-pixels SP may be disposed in the display panel 110.

The display panel 110 may include a display area AA in which a plurality of sub-pixels SP are disposed, and a non-display area NA positioned in a peripheral area of the display area AA (e.g., an edge area of the display area AA).

The display panel 100 may be formed to be planar, but is not limited thereto. For example, the display panel 100 may include a curved surface (not illustrated) formed on each of left and right ends thereof. The curved surface may have a constant curvature or a variable curvature. In addition, the display panel 110 may be formed to be flexible so that the display panel 110 can be bent, curved, folded, or rolled.

The plurality of sub-pixels SP may be arranged in the form of a matrix in the display area AA. In an embodiment, the plurality of sub-pixels SP may be disposed in the display area AA in PENTILE™ arrangement.

The plurality of data lines DL1 to DLn may be disposed in the display panel 110 and extend in a first direction (e.g., a direction across the display panel 110 from an upper side thereof to a lower side). The plurality of scan lines SL1 to SLm may be disposed in the display panel 110 and extend in a second direction (e.g., a direction across the display panel 110 from a left side thereof to a right side) different from the first direction. The plurality of reference voltage lines RVL1 to RVLh may be disposed in the display panel 110 and extend in the first direction, but are not limited thereto.

The data driving circuit 120 may include an output circuit 122 and a sensing circuit 124. In an embodiment, the output circuit 122 and the sensing circuit 124 may be formed to be functionally distinguished from each other in the same integrated circuit. In an embodiment, the output circuit 122 and the sensing circuit 124 may be respectively formed in different integrated circuits.

The output circuit 122 may be configured to supply data voltages to the plurality of data lines DL1 to DLn. The output circuit 122 may generate data voltages based on input image data DATA2 and a data driving circuit control signal DCS, and output the generated data voltages to the plurality of data lines DL1 to DLn at correct timings. The data driving circuit control signal DCS may include, for example, a source start pulse (SSP), a source shift clock (SSC), a source output enable (SOE) signal, an input control signal (ICS), and the like. Detailed description of the foregoing signals will be described below with reference to FIG. 5.

The sensing circuit 124 may be configured to input a reference voltage to the plurality of reference voltage lines RVL1 to RVLk in response to the data driving circuit control signal DCS, and sense voltages of the plurality of reference voltage lines RVL1 to RVLk. The sensing circuit 124 may convert a sensed voltage to a digital value Dsen corresponding thereto, and output the converted digital value Dsen. The sensing circuit 124 may include one or more analog-to-digital converters (ADCs). The data driving circuit control signal DCS may include, for example, a reference voltage switching signal, a sampling control signal, a hold control signal, and the like. Detailed description of the foregoing signals will be described below with reference to FIG. 4.

The data driving circuit 120 may be implemented as an integrated circuit (e.g., a source driver integrated circuit (SDIC)) formed separately from the display panel 110, or may be formed integrally with the display panel 110 and disposed in at least a portion of the non-display area NA of the display panel 110.

The scan driving circuit 130 is configured to output scan signals to the plurality of scan lines SL1 to SLn, in response to a scan driving circuit control signal SCS. The scan driving circuit control signal SCS may include a start signal instructing a frame to be started, a horizontal synchronization signal for outputting a scan signal at a correct timing at which a data voltage is applied, and the like.

The scan driving circuit 130 may be implemented as a gated driver integrated circuit (GDIC) formed separately from the display panel 110, or may be formed integrally with the display panel 110 and disposed in at least a portion of the non-display area NA of the display panel 110.

The timing controller 140 may be configured to control the data driving circuit 120 and the scan driving circuit 130. The timing controller 140 may generate and output control signals DCS and SCS for controlling the data driving circuit 120 and the scan driving circuit 130 based on a control signal CS (e.g., a synchronization signal, a clock signal, or the like) inputted from a host system 160.

The timing controller 140 may receive original image data DATA1 from the host system 160, and arrange the inputted original image data DATA1 on a pixel row basis. The timing controller 140 may convert the inputted original image data DATA1 to data corresponding to a preset interface (e.g., a low voltage differential signaling (LVDS), an embedded display port (eDP), or the like). The input image data DATA2 which is outputted from the timing controller 140 to the data driving circuit 120 may be data obtained as a result of the conversion in the timing controller 140 in response to the preset interface.

The timing controller 140 may be disposed in the display device 100 in the form of a logic or a processor. The timing controller 140 may include at least one register.

The power supply circuit 150 is configured to output a constant voltage of a constant level. The power supply circuit 150 may generate and output, for example, a first power voltage ELVDD and a second power voltage ELVSS to be supplied to the display panel 110. The power supply circuit 150 may include, for example, a power management integrated circuit (PMIC).

The host system 160 may include a set-top box, an application processor (AP), and the like. In an embodiment, the host system 160 may be an external component which is not included in the display device 100. In an embodiment, the host system 160 may be mounted in the display device 100. The original image data DATA1 and the control signal CS may be transmitted and received between the host system 160 and the display device 100 through an interface such as a serial programming interface (SPI), an inter integrated circuit (I2C), or a mobile industry processor interface (MIPI).

The display system DS in accordance with embodiments of the present disclosure may include a display device 100 and a host system 160.

In FIG. 1, the circuits 120, 130, 140, and 150 configured to supply signals, voltages, or the like to the display panel 110 are distinguished from each other only according to the function. For example, the data driving circuit 120 and the timing controller 140 may be formed in a single integrated circuit. The data driving circuit 120 and the timing controller 140 may be distinguished from each other according to the function in a single integrated circuit in the display device 100.

The display device 100 may be used not only as portable electronic devices such as a mobile phone, a smart phone, a tablet personal computer (a table PC), a smart watch, a watch phone, a mobile communication terminal, an electronic notebook, an electronic book, a portable multimedia player (PMP), a navigation device, and an ultra mobile personal computer (UMPC), but also as display screens of various products such as a television, a notebook, a monitor, an advertisement panel, and an internet of tings (IoT).

Figure 2:
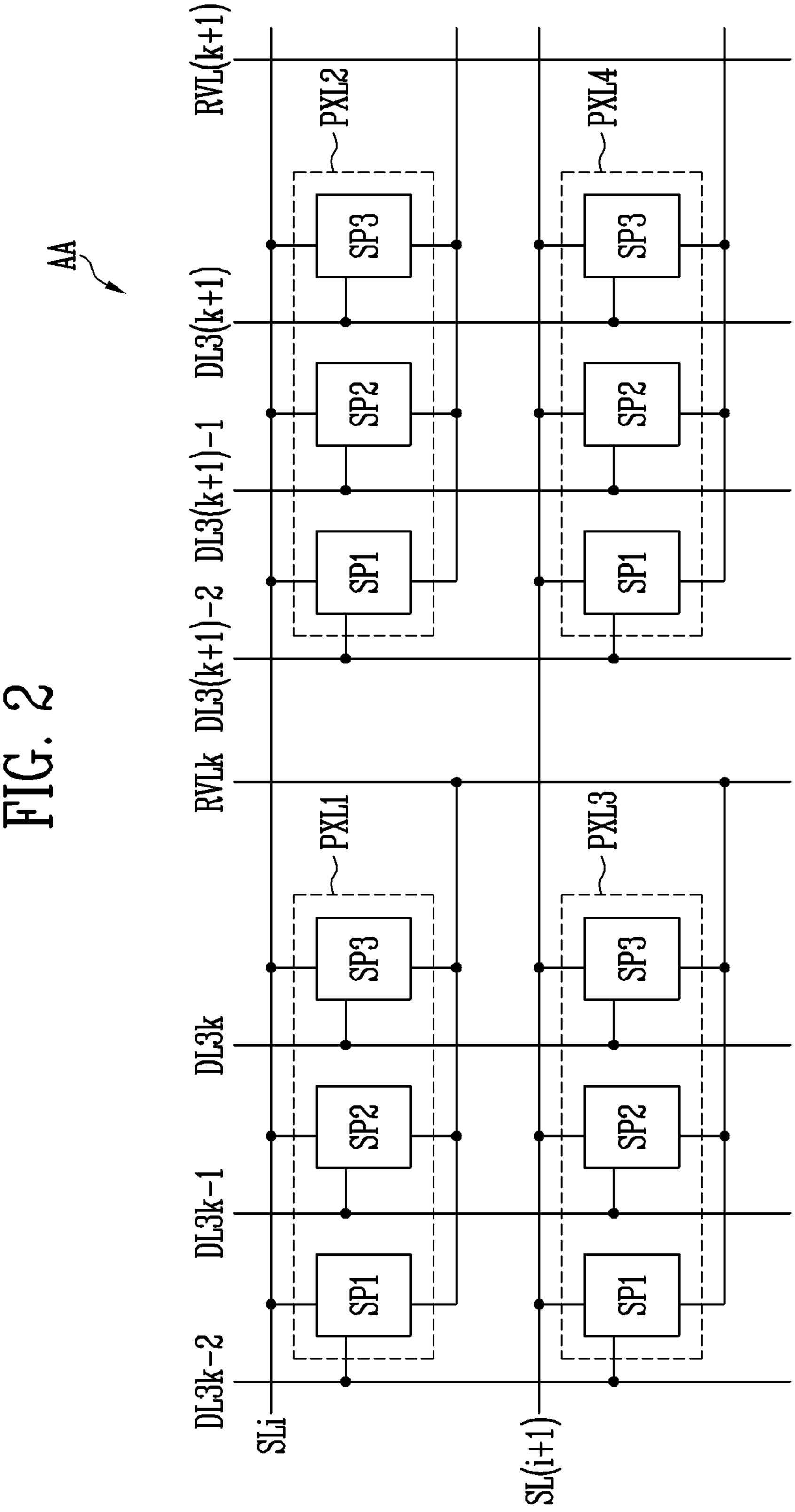
FIG. 2 is a conceptual view of a display area in accordance with embodiments of the present disclosure.

FIG. 2 is a conceptual view of the display area AA in accordance with embodiments of the present disclosure.

Referring to FIG. 2, there is illustrated four pixels PXL1 to PXL4 arranged in the form of a matrix. The four pixels PXL1 to PXL4 may be disposed adjacent to each other in a row direction, or may be disposed adjacent to each other in a column direction.

Any one pixel (e.g., a first pixel PXL1 disposed at the top left corner) among the fourth pixels PXL1 to PXL4 may include three or more sub-pixels SP1, SP2, and SP3.

Three sub-pixels SP1, SP2, and SP3 that constitute each pixel (e.g., the first pixel PXL1) may be configured to emit light in different wavelength bands. For example, the first sub-pixel SP1 may be configured to emit light in a red wavelength band. For example, the second sub-pixel SP2 may be configured to emit light in a green wavelength band. For example, the third sub-pixel SP3 may be configured to emit light in a blue wavelength band. In an embodiment, each pixel (e.g., PXL1) may further include a white sub-pixel (not illustrated) configured to emit white light. In an embodiment, each pixel (e.g., PXL1) may include two or more sub-pixels (e.g., two or more second sub-pixels SP2) configured to emit green light.

The red wavelength band may be a wavelength band ranging from approximately 600 nm to approximately 750 nm. The green wavelength band may be a wavelength band ranging from approximately 480 nm to approximately 560 nm. The blue wavelength band may be a wavelength band ranging from approximately 370 nm to approximately 460 nm.

Although there is described an example in which each of the four pixels PXL1 to PXL4 includes one first sub-pixel SP1, one second sub-pixel SP2, and one third sub-pixel SP3, the present disclosure is not limited thereto.

In embodiments of the present disclosure, the sub-pixels SP1, SP2, and SP3 that constitute each pixel (e.g., the first pixel PXL1) may be respectively electrically connected to corresponding data lines. For example, the first sub-pixel SP1, the second sub-pixel SP2, and the third sub-pixel SP3 of the first pixel PXL1 (or the third pixel PXL3) may be respectively electrically connected to three successively data lines DL3*k*-2, DL3*k*-1, and DL3*k* (k is an integer equal to or greater than 1 and less than h). For example, the first sub-pixel SP1, the second sub-pixel SP2, and the third sub-pixel SP3 of the second pixel PXL2 (or the fourth pixel PXL4) may be respectively electrically connected to three successive data lines DL3(*k*+1)-2, DL3(*k*+1)-1, and DL3(*k*+1).

In embodiments of the present disclosure, the sub-pixels SP1, SP2, and SP3 that constitute each pixel (e.g., the first pixel PXL1) may be electrically connected to a single reference voltage line. For example, the first sub-pixel SP1, the second sub-pixel SP2, and the third sub-pixel SP3 of the first pixel PXL1 (or the third pixel PXL3) may be electrically connected to a k-th reference voltage line RVLK. For example, the first sub-pixel SP1, the second sub-pixel SP2, and the third sub-pixel SP3 of the second pixel PXL2 (or the fourth pixel PXL4) may be electrically connected to a (k+1)-th reference voltage line RVL(k+1). Although not illustrated, in an embodiment, the sub-pixels SP1, SP2, and SP3 that constitute each pixel (e.g., the first pixel PXL1) may be respectively electrically connected to different reference voltage lines.

In embodiments of the present disclosure, the sub-pixels SP1, SP2, and SP3 that constitute each pixel (e.g., the first pixel PXL1) may be electrically connected to a single scan line. For example, the first sub-pixel SP1, the second sub-pixel SP2, and the third sub-pixel SP3 of the first pixel PXL1 (or the second pixel PXL2) may be electrically connected to an i-th scan line SLi (i is an integer equal to or greater than 1 and less than m). For example, the first sub-pixel SP1, the second sub-pixel SP2, and the third sub-pixel SP3 of the third pixel PXL3 (or the fourth pixel PXL4) may be electrically connected to an (i+1)-th scan line SL(i+1).

Referring to FIG. 2, the first pixel PXL1 positioned at the top left corner and the second pixel PXL2 positioned at the top right corner are electrically connected to the same scan line SLi. The first pixel PXL1 and the second pixel PXL2 are positioned on the same pixel row. Likewise, the third pixel PXL3 positioned at the bottom left corner and the fourth pixel PXL4 positioned at the bottom right corner are electrically connected to the same scan line SL(i+1). The third pixel PXL3 and the fourth pixel PXL4 are positioned on the same pixel row.

Referring to FIG. 2, the first pixel PXL1 positioned at the top left corner and the third pixel PXL3 positioned at the bottom left corner are electrically connected to the same data lines DL3*k*-2, DL3*k*-1, and DL3*k*. The first pixel PXL1 and the third pixel PXL3 are positioned on the same pixel column. Likewise, the second pixel PXL2 positioned at the top right corner and the fourth pixel PXL4 positioned at the bottom right corner are electrically connected to the same data lines DL3(*k*+1)-2, DL3(*k*+1)-1, and DL3*k*. The second pixel PXL2 and the fourth pixel PXL4 are positioned on the same pixel column.

In embodiments of the present disclosure, two or more pixel rows and two or more pixel columns may be positioned in the display area AA.

Figure 3:
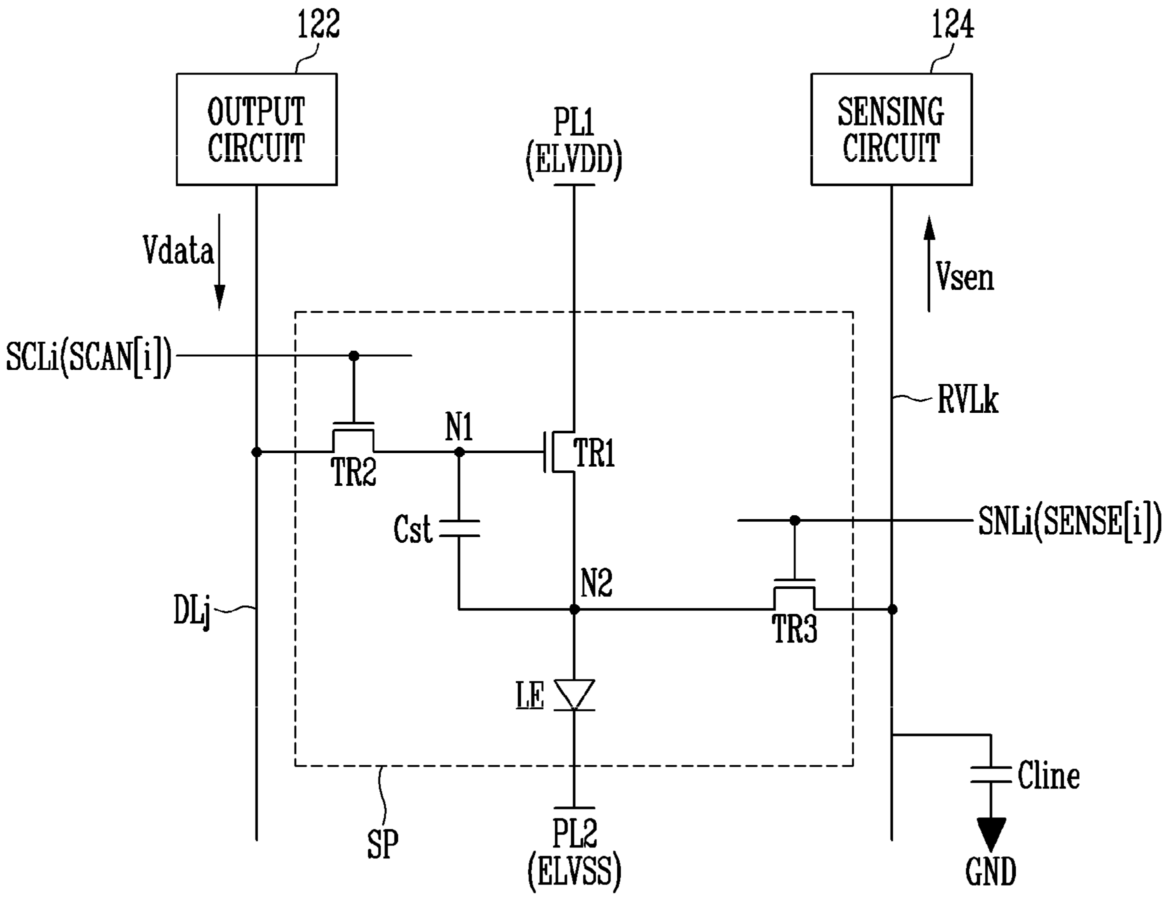
FIG. 3 illustrates an example of a sub-pixel in accordance with embodiments of the present disclosure.

FIG. 3 illustrates an example of the sub-pixel SP in accordance with embodiments of the present disclosure.

The sub-pixel SP in accordance with embodiments of the present disclosure may include a light emitting element LE, and one or more transistors configured to supply driving current to the light emitting element LE.

For example, referring to FIG. 3, the sub-pixel SP may include a light emitting element LE, first to third transistors TR1, TR2, and TR3, and a storage capacitor Cst.

The light emitting element LE may include a first electrode (either an anode or a cathode), a second electrode (a remaining one of the anode and the cathode), and an emission layer. The light emitting element LE may include an organic light emitting element (or an organic light emitting diode) having an organic emission layer. The light emitting element LE may include an inorganic light emitting element (or an inorganic light emitting diode) having an inorganic emission layer.

Referring to FIG. 3, the first electrode (e.g., an anode electrode) of the light emitting element LE may be electrically connected to a second node N2. The second electrode (e.g., the cathode electrode) of the light emitting element LD may be electrically connected to a second power line PL2.

The second power voltage ELVSS may be applied to the second power line PL2. The second common voltage ELVSS may be, for example, a low-potential common voltage or a ground voltage.

The first transistor TR1 may be configured to switch electrical connection between a first power line PL1 and the second node N2. The first transistor TR1 may include a gate electrode, a first electrode (either a source electrode or a drain electrode), and a second electrode (a remaining one of the source electrode and the drain electrode). The gate electrode of the first transistor TR1 may be electrically connected to the second transistor TR2 on a first node N1. The first electrode (e.g., the drain electrode) of the first transistor TR1 may be electrically connected to the first power line PL1. The first power voltage ELVDD may be applied to the first electrode of the first transistor TR1. The first power voltage ELVDD may be, for example a high-potential power voltage. The second electrode (e.g., the source electrode) of the first transistor TR1 may be electrically connected to the light emitting element LE on the second node N2. The first transistor TR1 may receive a data voltage Vdata through the second transistor TR2. Current (e.g., drain current) having a magnitude corresponding to the inputted data voltage Vdata may flow through the first transistor TR1.

The second transistor TR2 may be configured to switch electrical connection between the data line DLj and the first node N1. The second transistor TR2 may be controlled in operation timing by a scan signal SCAN[i]. The second transistor TR2 may be turned on in response to a scan signal SCAN[i] of a turn-on level so that the data voltage Vdata can be applied to the first node N1.

The third transistor TR3 may be configured to switch electrical connection between the second node N2 and the reference voltage line RVLk. The third transistor TR3 may be controlled in operation timing by a sensing signal SENSE [i]. The third transistor TR3 may be turned on in response to a sensing signal SENSE[i] of a turn-on level. If the third transistor TR3 is turned on, the voltage of the second node N2 may be applied to the reference voltage line RVLK. The voltage applied to the reference voltage line RVLk may be stored in a line capacitor Cline.

Referring to FIG. 3, all of the first to third transistors TR1, TR2, and TR3 (hereinafter TR1 to TR3) are illustrated as being N-type transistors. In this case, in the first to third transistors TR1 to TR3, a turn-on level voltage may be a high logic level voltage, and a turn-off level voltage may be a low logic level voltage. In an embodiment, at least one of the first to third transistors TR1 to TR3 may be a P-type transistor. In this case, in the P-type transistor, a turn-on level voltage may be a low logic level voltage, and a turn-off level voltage may be a high logic level voltage.

At least one of the first to third transistors TR1 to TR3 may include an amorphous silicon (a-Si) semiconductor. At least one of the first to third transistors TR1 to TR3 may include a polycrystalline silicon (poly-Si) semiconductor. At least one of the first to third transistors TR1 to TR3 may include an oxide semiconductor.

The storage capacitor Cst may be configured to maintain a difference in voltage between the first node N1 and the second node N2. The storage capacitor Cst may include a first side electrode electrically connected to the first node N1, and a second side electrode electrically connected to the second node N2. The storage capacitor Cst may be formed of a physical capacitor element rather than a parasitic capacitor.

The scan signal SCAN[i] may be applied to a scanning line SCLi (or a first scanning line SCLi). The sensing signal SENSE[i] may be applied to the sensing line SNLi (or a second scanning line SNLi). In an embodiment, the scan signal SCAN[i] and the sensing signal SENSE[i] may be the same signal. In this case, the scanning line SCLi and the sensing line SNLi may be the same line. In an embodiment, the scan signal SCAN[i] and the sensing signal SENSE[i] may be different signals. In this case, the scanning line SCLi and the sensing line SNLi may be different lines. Referring to FIG. 1, the scan line SLi may include the scanning line SCLi and the sensing line SNLi.

The output circuit 122 may output the data voltage Vdata to the data line DLj. The sensing circuit 124 may receive an analog sensing voltage Vsen applied to the reference voltage line RVLk.

Figure 4:
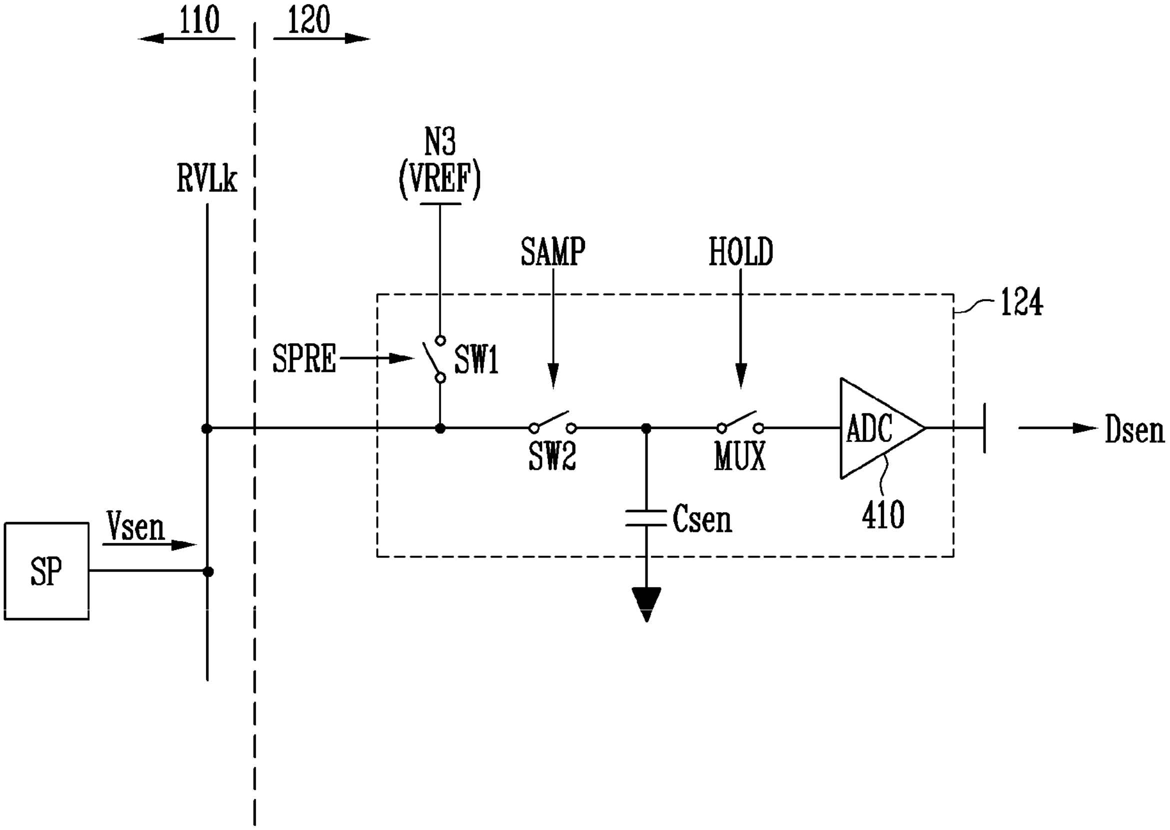
FIG. 4 is a diagram illustrating a sensing circuit in accordance with embodiments of the present disclosure.

FIG. 4 is a diagram illustrating the sensing circuit 124 in accordance with embodiments of the present disclosure.

The sensing circuit 124 may be included in the data driving circuit 120. The sensing circuit 124 may receive an analog sensing voltage Vsen from the reference voltage line RVLK. The sensing circuit 124 may convert the inputted analog sensing voltage Vsen to a digital value Dsen, and output the digital value Dsen.

Referring to FIG. 4, the sensing circuit 124 may include a first switching element SW1, a second switching element SW2, a multiplexer MUX, a sensing capacitor Csen, an analog-to-digital converter 410, and the like.

The first switching element SW1 may be configured to switch electrical connection between the third node N3 and the reference voltage line RVLk. The first switching element SW1 may be controlled in operation timing by the reference voltage switching signal SPRE. If the first switching element SW1 is turned on in response to a reference voltage switching signal SPRE of a turn-on level, the reference voltage VREF may be applied to the reference voltage line RVLK. The first switching element SW1 may include a transistor.

The second switching element SW2 may be configured to switch electrical connection between the reference voltage line RVLk and the sensing capacitor Csen. The second switching element SW2 may be controlled in operation timing by a sampling control signal SAMP. If the second switching element SW2 is turned on in response to a sampling control signal SAMP of a turn-on level, the analog sensing voltage Vsen is applied to the sensing capacitor Csen.

The sensing capacitor Csen may include a first side electrode electrically connected to the second switching element SW2, and a second side electrode to which a constant voltage (or the ground voltage) is to be applied. A voltage corresponding to the analog sensing voltage Vsen may be stored in the first side electrode of the sensing capacitor Csen.

The multiplexer MUX may be configured to switch electrical connection between the sensing capacitor Csen and the analog-to-digital converter 410. The multiplexer MUX may include two or more input terminals. The multiplexer MUX may be controlled in operation timing by a hold control signal HOLD. If the multiplexer MUX is turned on in response to a hold control signal HOLD, the voltage (e.g., the analog sensing voltage Vsen) stored in the sensing capacitor Csen may be inputted to the analog-to-digital converter 410.

The analog-to-digital converter 410 may be configured to receive an analog voltage (e.g., an analog sensing voltage Vsen), and convert the inputted analog voltage to a corresponding digital value Dsen and output the digital value Dsen.

Hence, in embodiments of the present disclosure, the analog sensing voltage Vsen sensed from the sub-pixel SP may be converted to a digital value Dsen corresponding thereto, and the digital value Dsen may be outputted.

Figure 5:
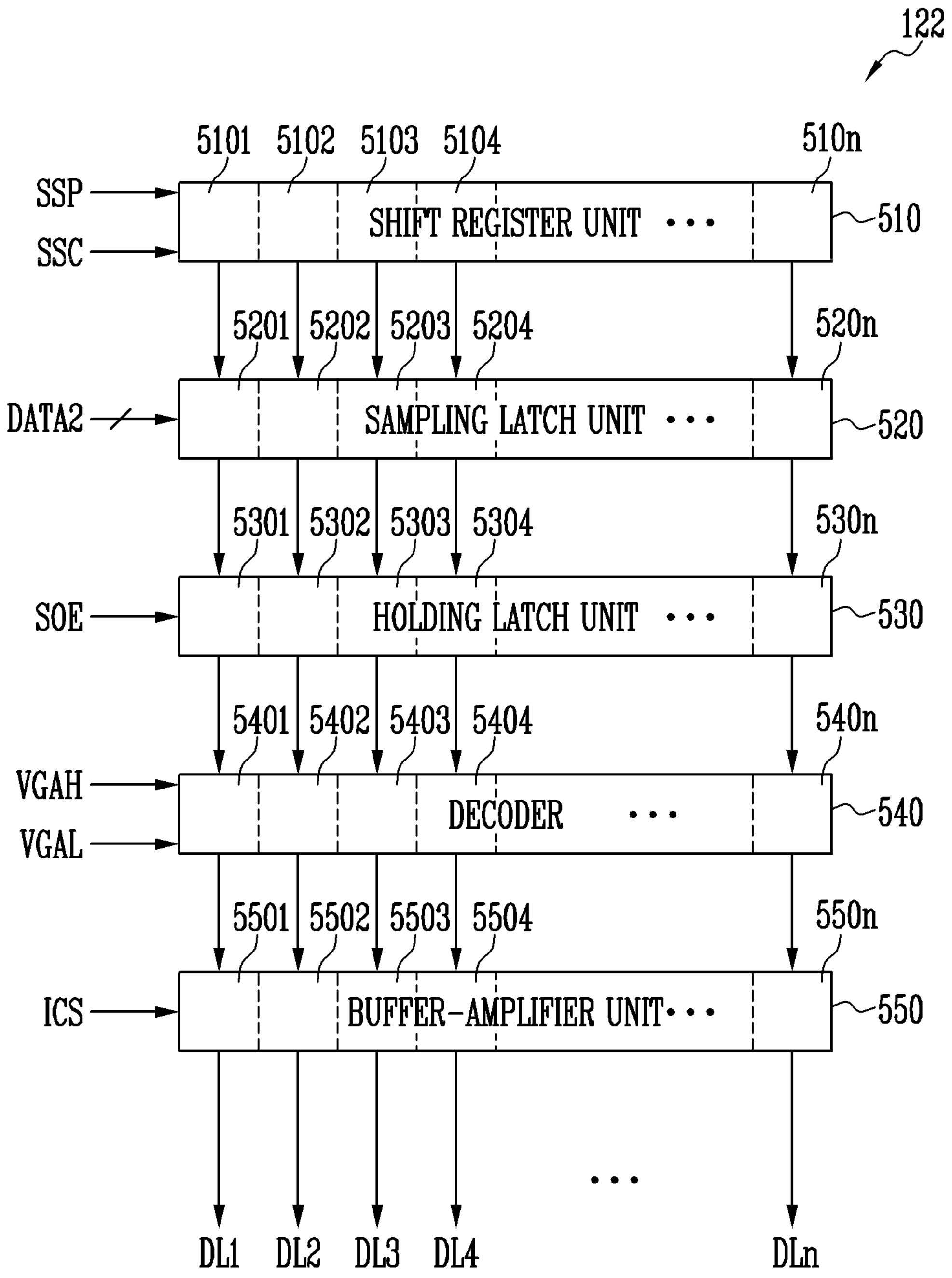
FIG. 5 is a diagram illustrating an output circuit in accordance with embodiments of the present disclosure.

FIG. 5 is a diagram illustrating the output circuit 122 in accordance with embodiments of the present disclosure.

Referring to FIG. 5, the output circuit 122 may include a shift register unit 510, a sampling latch unit 520, a holding latch unit 530, a decoder 540, a buffer-amplifier unit 550, and the like.

The shift register unit 510 may sequentially generate n sampling signals in response to a source start pulse SSP and a source shift clock SSC. In detail, the shift register unit 510 may sequentially generate n sampling signals by shifting the source start pulse SSP at each cycle of the source shift clock SSC. The shift register unit 510 may include n shift registers 5101 to 510*n*.

The sampling latch unit 520 may sequentially latch (or store) input image data DATA2 in response to sampling signals which are sequentially supplied from the shift register unit 510. The sampling latch unit 520 may include n sampling latches 5201 to 520*n* configured to store n pieces of input image data DATA2.

The holding latch unit 530 may latch (or store) the input image data DATA2 supplied from the sampling latch unit 520, in response to a source output enable signal SOE. The holding latch unit 530 may supply the stored input image data DATA2 to the decoder 540. The holding latch unit 530 may include n holding latches 5301 to 530*n*.

The decoder 540 may convert the input image data DATA2 outputted from the holding latch unit 530 to an analog signal (e.g., an analog voltage). The decoder 540 may output the converted analog signal to the buffer-amplifier unit 550. The decoder 540 may receive a minimum grayscale gamma voltage VGAL and a maximum grayscale gamma voltage VGAH. The decoder 540 may select grayscale voltages corresponding to the input image data DATA2 inputted from the holding latch unit 530, based on the inputted minimum grayscale gamma voltage VGAL and the inputted maximum grayscale gamma voltage VGAH. The decoder 540 may include n digital-to-analog converters 5401 to 540*n*. The decoder 540 may generate n data voltages using the digital-to-analog converters 5401 to 540*n* disposed corresponding to respective channels (e.g., respective data lines DL1 to DLn), and supply the generated data voltages to the buffer-amplifier unit 550.

The buffer-amplifier unit 550 may supply, to n data lines DL1 to DLn, n data voltages supplied from the decoder 540. The buffer-amplifier unit 550 may include n buffer-amplifiers 5501 to 550*n*. An input control signal ICS may be inputted to the buffer-amplifier unit 550. The input control signal ICS will be described in more detail with reference to FIG. 8A and subsequent drawings.

Figure 6A:
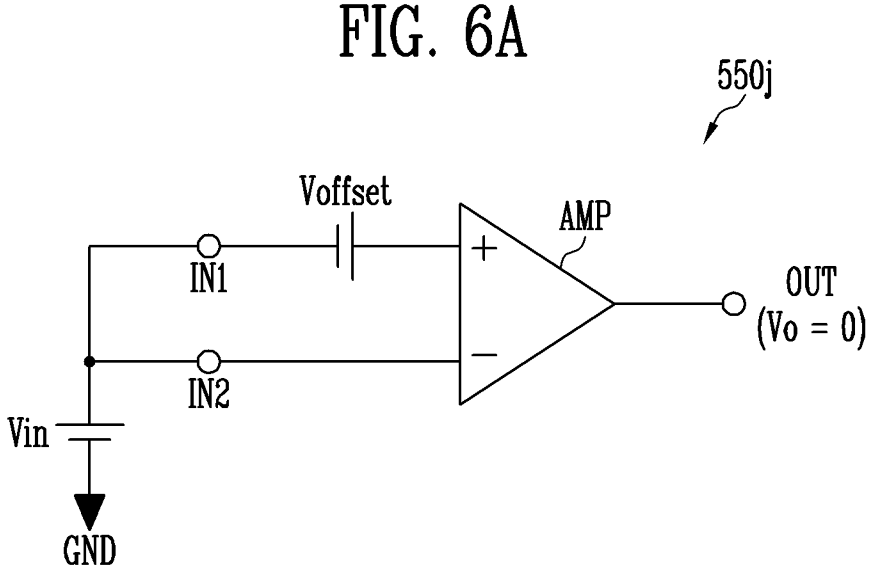
FIG. 6A is a diagram for describing an offset voltage of a buffer-amplifier in accordance with embodiments of the present disclosure.

FIG. 6A is a diagram for describing an offset voltage Voffset of a buffer-amplifier 550*j* in accordance with embodiments of the present disclosure.

The buffer-amplifier 550*j* in accordance with embodiments of the present disclosure may include an amplifier AMP, a first input terminal IN1, a second input terminal IN2, and an output terminal OUT.

The amplifier AMP may include a non-inverting input terminal (a "+" terminal of FIG. 6A) and an inverting input terminal (a "–" terminal of FIG. 6A). The amplifier AMP may output a value obtained by multiplying a difference in voltage between the non-inverting input terminal and the inverting input terminal by a preset gain value. Referring to FIG. 6A, the non-inverting input terminal of the amplifier AMP is electrically connected to the first input terminal IN1, and the inverting input terminal is electrically connected to the second input terminal IN2. In an ideal case, an output voltage Vo outputted from the amplifier AMP can be obtained from the following equation 1.

$$Vo = \mathrm{Gain}(Vin1 - Vin2) \quad \text{[Equation 1]}$$

In Equation 1, Vo denotes an output voltage of the amplifier AMP. Vin1 denotes a voltage inputted to the non-inverting input terminal as a voltage of the first input terminal IN1. Vin2 denotes a voltage inputted to the inverting input terminal as a voltage of the second input terminal IN2. Gain denotes a gain value of the amplifier AMP.

In the amplifier AMP of an ideal case, if the same voltage is applied to the first input terminal IN1 and the second input terminal IN2, the output voltage Vo should be 0 (zero). However, due to a fabrication error or the like which may occur during a process of fabricating the amplifier AMP, the amplifier AMP may have an intrinsic offset value. In this case, even if the same voltage (e.g., Vin) is applied to the first input terminal IN1 and the second input terminal IN2, the output voltage Vo of the amplifier AMP may not be 0.

FIG. 6A illustrates the offset voltage Voffset of the amplifier AMP expressed in an equivalent circuit diagram. Taking into account the offset voltage Voffset of the amplifier AMP, the output voltage Vo of the amplifier AMP is as follows.

$$Vo = \text{Gain}((Vin1 + Voffset) - Vin2) \quad \text{[Equation 2]}$$

Hereinafter, the output voltage Vo of the amplifier AMP will be described based on Equation 2 in which the offset voltage Voffset of the amplifier AMP is reflected. In the present specification, the output voltage Vo may be the same as the data voltage Vdata (refer to FIG. 3) described above. The offset voltage Voffset of the amplifier AMP may be reflected in the output voltage Vo (or the data voltage Vdata) as "deviation voltage".

Figure 6B:
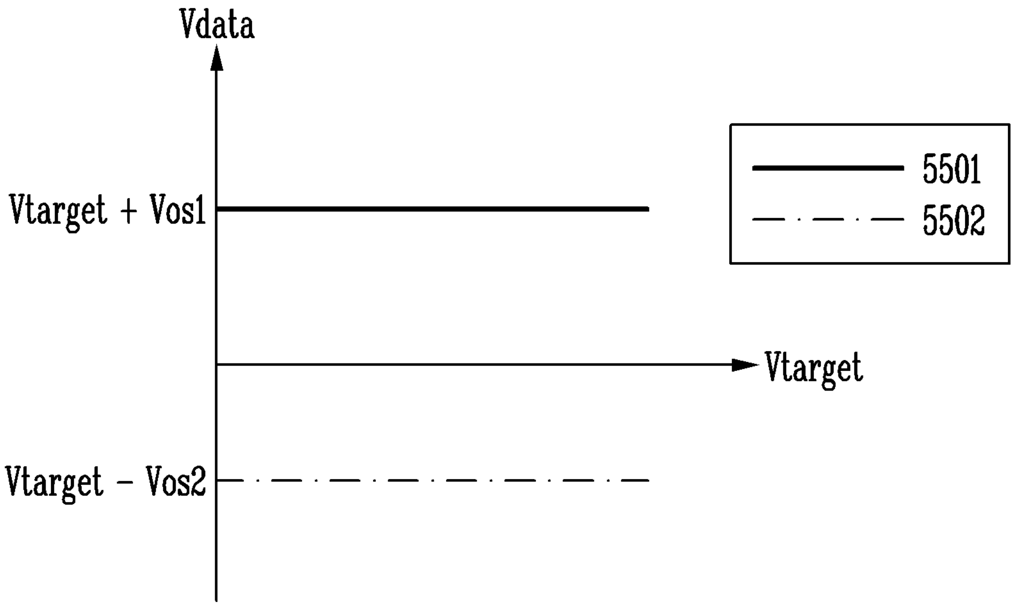
FIG. 6B is a diagram illustrating a deviation in data voltage in accordance with embodiments of the present disclosure.

FIG. 6B is a diagram illustrating a deviation in data voltage Vdata in accordance with embodiments of the present disclosure.

As described above with reference to FIG. 6A, the offset voltage Voffset may be changed in magnitude by amplifiers. Referring to FIG. 6B, based on a target data voltage Vtarget, the first buffer amplifier 5501 (or the data voltage Vdata outputted from the first buffer-amplifier 5501) may include a first deviation voltage Vos1. Based on the target data voltage Vtarget, the second buffer amplifier 5502 (or the data voltage Vdata outputted from the second buffer-amplifier 5502) may include a second deviation voltage Vos2.

With regard to a polarity of the deviation voltage, the deviation voltage of the buffer-amplifier may have a positive polarity (i.e., a positive direction), or may have a negative polarity (i.e., a negative direction). Referring to FIG. 6B, the first buffer-amplifier 5501 may have a first deviation voltage +Vos1 of the positive polarity. The second buffer-amplifier 5502 may have a second deviation voltage −Vos2 of the negative polarity.

Figure 7:
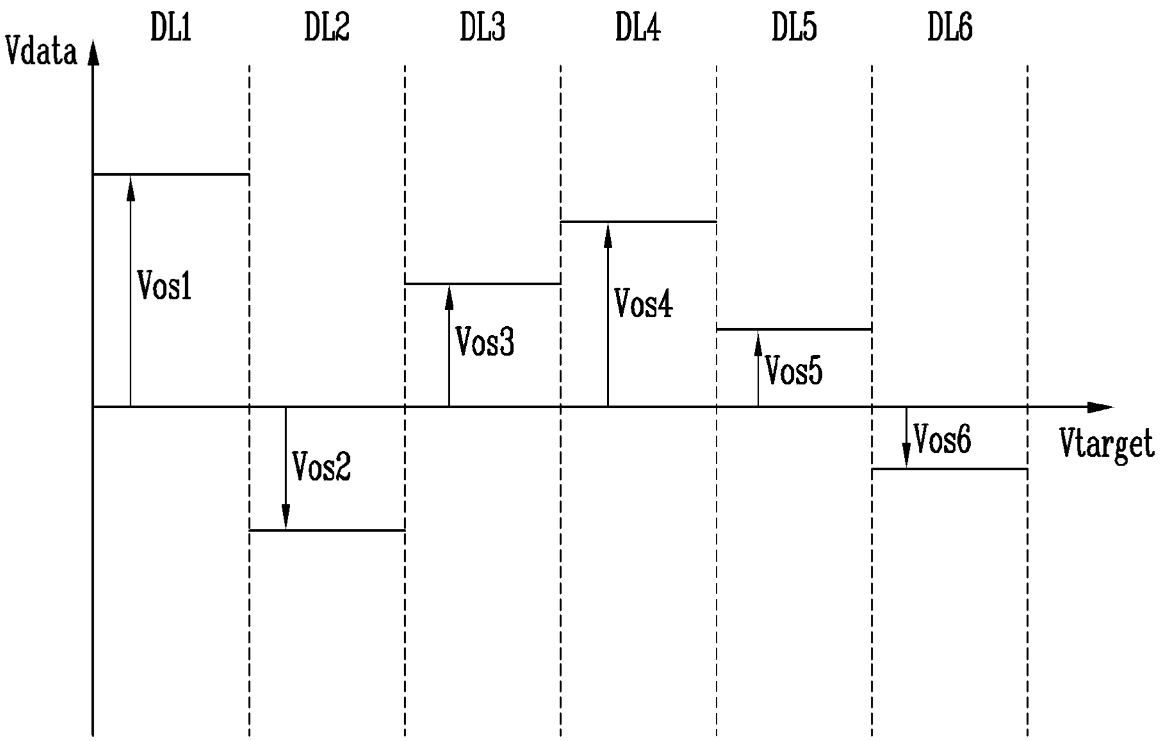
FIG. 7 is a diagram illustrating a difference in deviation voltage between amplifiers in accordance with embodiments of the present disclosure.

FIG. 7 is a diagram illustrating a difference in deviation voltage between amplifiers in accordance with embodiments of the present disclosure.

For example, referring to FIG. 7, a data voltage Vdata inputted to a first data line DL1 may be greater than the target data voltage Vtarget by a first deviation voltage Vos1. A data voltage Vdata inputted to a second data line DL2 may be less than the target data voltage Vtarget by a second deviation voltage Vos2. A data voltage Vdata inputted to a third data line DL3 may be greater than the target data voltage Vtarget by a third deviation voltage Vos3. A data voltage Vdata inputted to a fourth data line DL4 may be greater than the target data voltage Vtarget by a third deviation voltage Vos4. A data voltage Vdata inputted to a fifth data line DL5 may be greater than the target data voltage Vtarget by a third deviation voltage Vos5. A data voltage Vdata inputted to a sixth data line DL6 may be less than the target data voltage Vtarget by a sixth deviation voltage Vos6.

As such, because each amplifier AMP (refer to FIG. 6A) has a different offset voltage, a voltage greater or less than the data voltage Vdata corresponding to a desired grayscale value by a certain extent may be applied to the data line.

In a general amplifier, the deviation voltage is known as being approximately the maximum ±30 mV. A deviation voltage of ±30 mV may correspond to an error of approximately ±3 grayscales, based on a low grayscale image. Hence, a bright line or a dark line (particularly, a bright line) may be visible to a user of the display device. In this art, an aspect of the present disclosure is to provide a method of solving a problem of deterioration in display quality due to an offset voltage of the amplifier.

Embodiments of the present disclosure may provide the display device 100 (refer to FIG. 1) that is improved in display quality by compensating for an offset voltage of the amplifier.

Figure 8A:
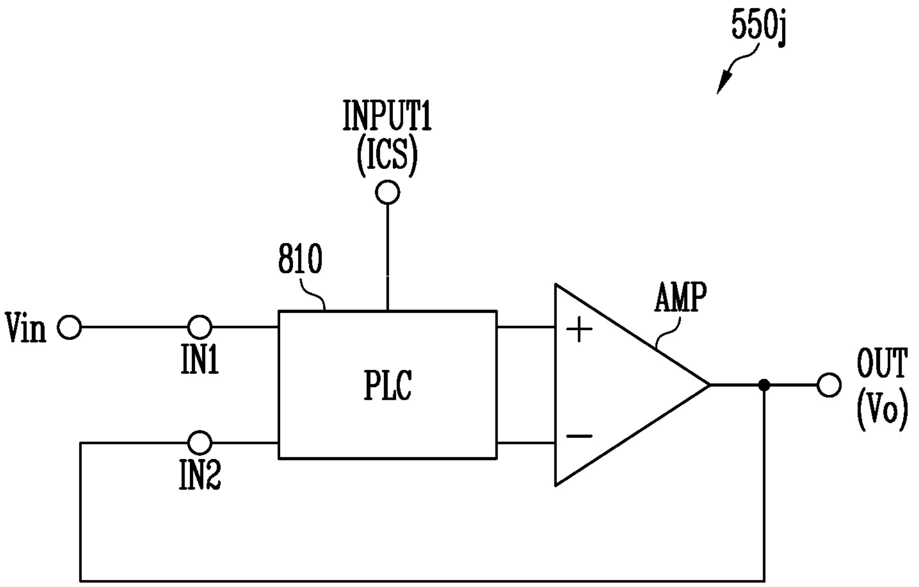
FIG. 8A is an equivalent circuit diagram of a buffer-amplifier in accordance with embodiments of the present disclosure.

FIG. 8A is an equivalent circuit diagram of the buffer-amplifier 550*j* in accordance with embodiments of the present disclosure.

Embodiments of the present disclosure may include an offset control circuit 810. Referring to FIG. 8A, the buffer-amplifier 550*j* may include an offset control circuit 810.

The offset control circuit 810 may be electrically connected to the first input terminal IN1, the second input terminal IN2, a third input terminal INPUT1, the non-inverting input terminal (+) of the amplifier AMP, and the inverting input terminal (−) of the amplifier AMP.

A first voltage Vin may be applied to the first input terminal IN1. The first voltage Vin applied to the first input terminal IN1 may correspond to a voltage outputted from the decoder 540 (refer to FIG. 5) described above.

The second input terminal IN2 may be electrically connected to the output terminal OUT. The output voltage Vo may be applied to the second input terminal IN2. In other words, a feedback structure may be formed.

The input control signal ICS may be inputted to the third input terminal INPUT1.

The offset control circuit 810 may control the output voltage Vo to be inputted to the non-inverting input terminal (+) or the inverting input terminal (−) of the amplifier AMP in response to the input control signal ICS.

For example, in response to a first logic level (e.g., either a high logic level or a low logic level), the offset control circuit 810 may electrically connect the first input terminal IN1 and the non-inverting input terminal (+) of the amplifier AMP, and electrically connect the second input terminal IN2 and the inverting input terminal (−) of the amplifier AMP. In this case, the output voltage Vo outputted to the output terminal OUT may be obtained from the following equation 3.

$$Vo = \text{Gain}\{(Vin + Voffset) - Vo\} \quad \text{[Equation 3]}$$

In Equation 3, Gain denotes a gain value of the amplifier AMP. Voffset denotes an offset voltage of the amplifier AMP. The output voltage Vo in Equation 3 may be arranged as shown in the following equation 4.

$$Vo = \frac{\text{Gain}\,(Vin + Voffset)}{\text{Gain} + 1} \quad \text{[Equation 4]}$$

Referring to Equation 4, the offset voltage of the amplifier AMP may be reflected as a positive polarity (or a non-inverted phase) in the output voltage Vo by an input control signal ICS of a first logic level. Reflected in the output voltage Vo by the offset voltage Voffset, the deviation voltage (+Vos) of the positive polarity is obtained as shown in the following equation 5.

$$+Vos = \frac{\text{Gain}}{\text{Gain} + 1} Voffset \quad \text{[Equation 5]}$$

In another example, in response to a second logic level (e.g., a remaining one of the high logic level and the low logic level), the offset control circuit 810 may electrically connect the second input terminal IN2 and the non-inverting input terminal (+) of the amplifier AMP, and electrically connect the first input terminal IN1 and the inverting input terminal (−) of the amplifier AMP. In this case, the output voltage Vo outputted to the output terminal OUT may be obtained from the following equation 6.

$$Vo = \text{Gain}\{(Vo + Voffset) - Vin\} \quad \text{[Equation 6]}$$

The output voltage Vo in Equation 6 may be arranged as shown in the following equation 7.

$$Vo = \frac{\text{Gain}(Vin + Voffset)}{\text{Gain} + 1} \quad \text{[Equation 7]}$$

Referring to Equation 7, the offset voltage of the amplifier AMP may be reflected as a negative polarity (or an inverted phase) in the output voltage Vo by an input control signal ICS of a second logic level. Reflected in the output voltage Vo by the offset voltage Voffset, the deviation voltage (−Vos) of the negative polarity is obtained as shown in the following equation 8.

$$-Vos = \frac{\text{Gain}}{\text{Gain} - 1} Voffset \quad \text{[Equation 8]}$$

According to Equations 3 to 8, the offset voltage Voffset of the amplifier AMP may be reflected as a positive polarity in the output voltage Vo by the input control signal ICS, or may be reflected therein as a negative polarity.

The offset control circuit 810 may include an input control logic circuit PLC. The input control logic circuit PLC may electrically connect the non-inverting input terminal (+) of the amplifier AMP to either the first input terminal IN1 or the second input terminal IN2, in response to the input control signal ICS. The input control logic circuit PLC may electrically connect the inverting input terminal (−) of the amplifier AMP to a remaining one of the first input terminal IN1 and the second input terminal IN2, in response to the input control signal ICS.

Figure 8B:
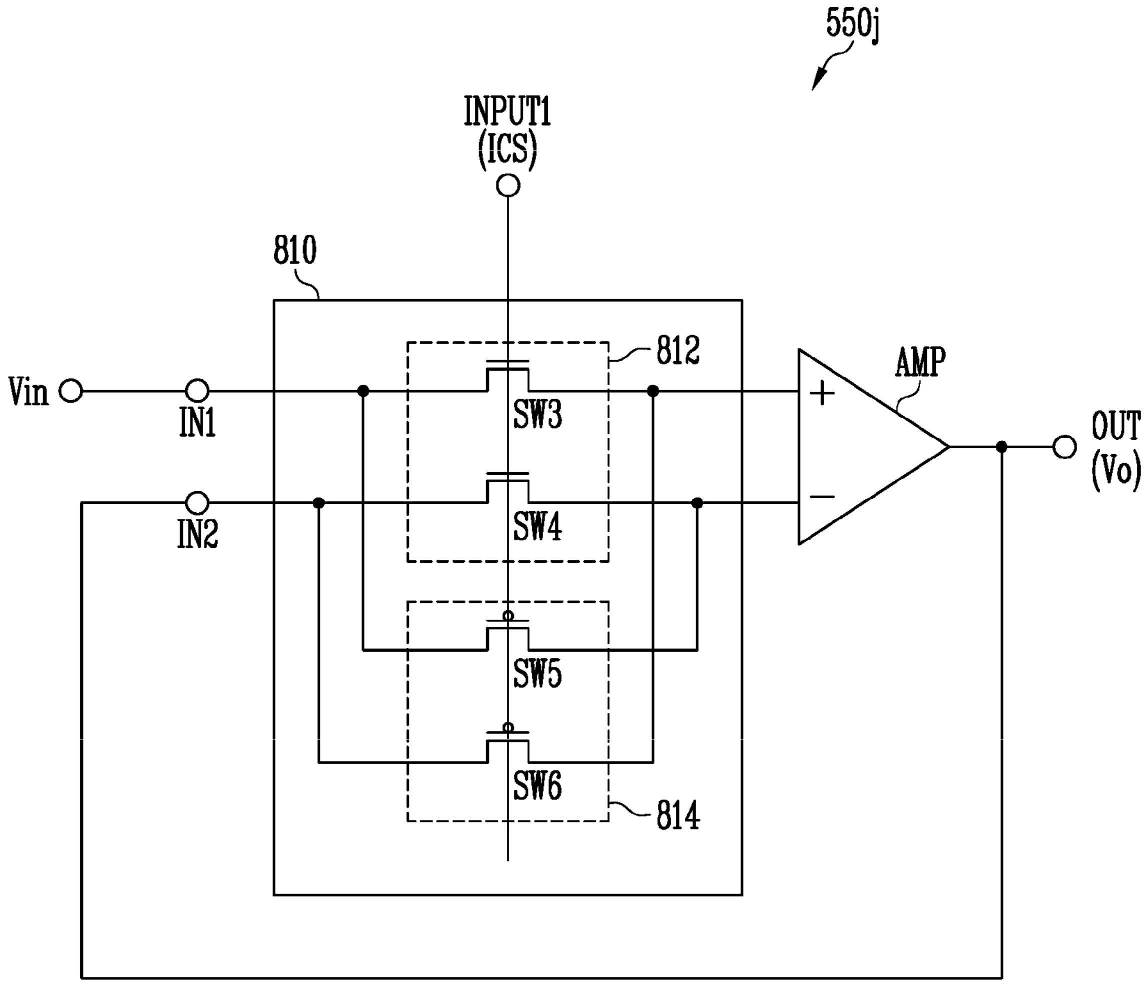
FIG. 8B is an equivalent circuit diagram illustrating a detailed example of an input control logic circuit of FIG. 8A.

FIG. 8B is an equivalent circuit diagram illustrating a detailed example of the input control logic circuit PLC of FIG. 8A.

Referring to FIG. 8B, the offset control circuit 810 in accordance with embodiments of the present disclosure may include a first switching circuit 812 and a second switching circuit 814. The first switching circuit 812 and the second switching circuit 814 are only illustrative examples for embodying the above-mentioned input control logic circuit PLC (refer to FIG. 8A), and the present disclosure is not limited thereto.

The first switching circuit 812 and the second switching circuit 814 may be alternately turned on. In other words, during a period in which switching elements that form the first switching circuit 812 are turned on, switching elements that form the second switching circuit 814 may be turned off. During a period in which switching elements that form the first switching circuit 812 are turned off, switching elements that form the second switching circuit 814 may be turned on.

The first switching circuit 812 may include a third switching element SW3 and a fourth switching element SW4. The third switching element SW3 may be configured to switch electrical connection between the first input terminal IN1 and the non-inverting input terminal (+) of the amplifier AMP. The fourth switching element SW4 may be configured to switch electrical connection between the second input terminal IN2 and the inverting input terminal (−) of the amplifier AMP. All of the third switching element SW3 and the fourth switching element SW4 may be implemented as N-type transistors, or may be implemented as P-type transistors. Although the case where all of the third switching element SW3 and the fourth switching element SW4 are implemented as N-type transistors is described with reference to FIG. 8B by way of example, the present disclosure is not limited thereto.

The second switching circuit 814 may include a fifth switching element SW5 and a sixth switching element SW6. The fifth switching element SW5 may be configured to switch electrical connection between the first input terminal IN1 and the inverting input terminal (−) of the amplifier AMP. The sixth switching element SW6 may be configured to switch electrical connection between the second input terminal IN2 and the non-inverting input terminal (+) of the amplifier AMP. All of the fifth switching element SW5 and the sixth switching element SW6 may be implemented as P-type transistors, or may be implemented as N-type transistors. Although the case where all of the fifth switching element SW5 and the sixth switching element SW6 are implemented as P-type transistors is described with reference to FIG. 8B by way of example, the present disclosure is not limited thereto.

Referring to FIG. 8B, in response to an input control signal ICS of a high logic level, the third switching element SW3 and the fourth switching element SW4 are turned on, and the fifth switching element SW5 and the sixth switching element SW6 are turned off. Hence, the first input terminal IN1 is electrically connected to the non-inverting input terminal (+) of the amplifier AMP, and the second input terminal IN2 is electrically connected to the inverting input terminal (−) of the amplifier AMP.

Referring to FIG. 8B, in response to an input control signal ICS of a low logic level, the third switching element SW3 and the fourth switching element SW4 are turned off, and the fifth switching element SW5 and the sixth switching element SW6 are turned on. Hence, the first input terminal IN1 is electrically connected to the inverting input terminal (−) of the amplifier AMP, and the second input terminal IN2 is electrically connected to the non-inverting input terminal (+) of the amplifier AMP.

The output voltage Vo outputted from the amplifier AMP in response to the input control signal ICS of a high logic level is as described in Equation 4. The output voltage Vo outputted from the amplifier AMP in response to the input control signal ICS of a low logic level is as described in Equation 7. Hence, the output voltage Vo reflecting the offset voltage of the amplifier AMP as a positive polarity or a negative polarity may be outputted.

Figure 9:
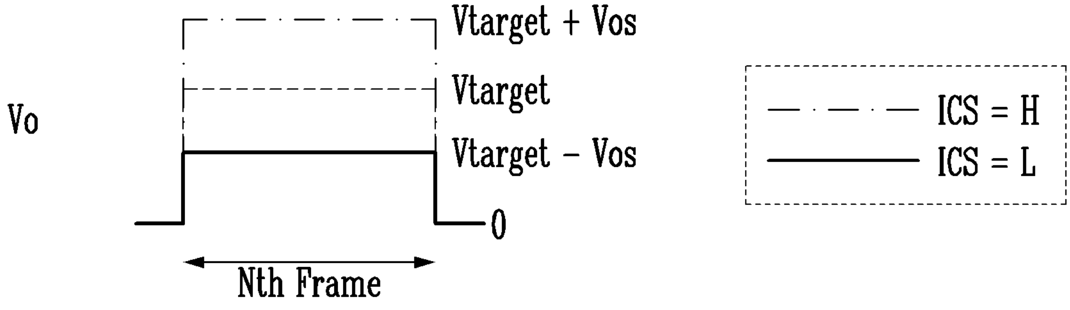
FIG. 9 is a diagram illustrating a waveform of an output voltage reflecting an offset voltage in a non-inverted phase, and a waveform of an output voltage reflecting an offset voltage in an inverted phase.

FIG. 9 is a diagram illustrating a waveform of the output voltage Vo reflecting the offset voltage in a non-inverted phase, and a waveform of the output voltage Vo reflecting the offset voltage in an inverted phase.

Referring to FIG. 9, the waveform of the output voltage Vo reflecting the offset voltage of the amplifier (hereinafter, referred to simply as "offset voltage") in a non-inverted phase is illustrated by an alternated long and short dash line, and the waveform of the output voltage Vo reflecting the offset voltage in an inverted phase is illustrated by a solid line. In other words, the alternated long and short dash line may indicate the waveform of the output voltage Vo in the case where the input control signal ICS is at a first logic level (e.g., a high logic level H). The solid line may indicate the waveform of the output voltage Vo in the case the input control signal ICS is at a second logic level (e.g., a low logic level L). A dotted line indicates the target data voltage Vtarget.

The value of the output voltage Vo reflecting the offset voltage in a non-inverted phase is indicated by Vtarget+Vos. The value of the output voltage Vo reflecting the offset voltage in an inverted phase is indicated by Vtarget−Vos. In an N-th frame Nth Frame, depending on the level of the input control signal ICS, the offset voltage of an inverted phase may be reflected in the output voltage Vo, or the offset voltage of a non-inverted phase may be reflected therein.

Depending on the polarity of the offset voltage itself, the value Vtarget+Vos of the output voltage Vo reflecting the offset voltage in a non-inverted phase may be greater than the target data voltage Vtarget. The value Vtarget−Vos of the output voltage Vo reflecting the offset voltage in an inverted phase may be less than the target data voltage Vtarget. Alternatively, the value Vtarget+Vos of the output voltage Vo reflecting the offset voltage in an inverted phase may be less than the target data voltage Vtarget. The value Vtarget−Vos of the output voltage Vo reflecting the offset voltage in an inverted phase may be greater than the target data voltage Vtarget.

Hereinafter, for convenience of explanation, there will be described an example where the value Vtarget+Vos of the output voltage Vo reflecting the offset voltage in a non-inverted phase is greater than the target data voltage Vtarget, and the value Vtarget−Vos of the output voltage Vo reflecting the offset voltage in an inverted phase is less than the target data voltage Vtarget. However, the present disclosure is not limited to the foregoing.

Figure 10:
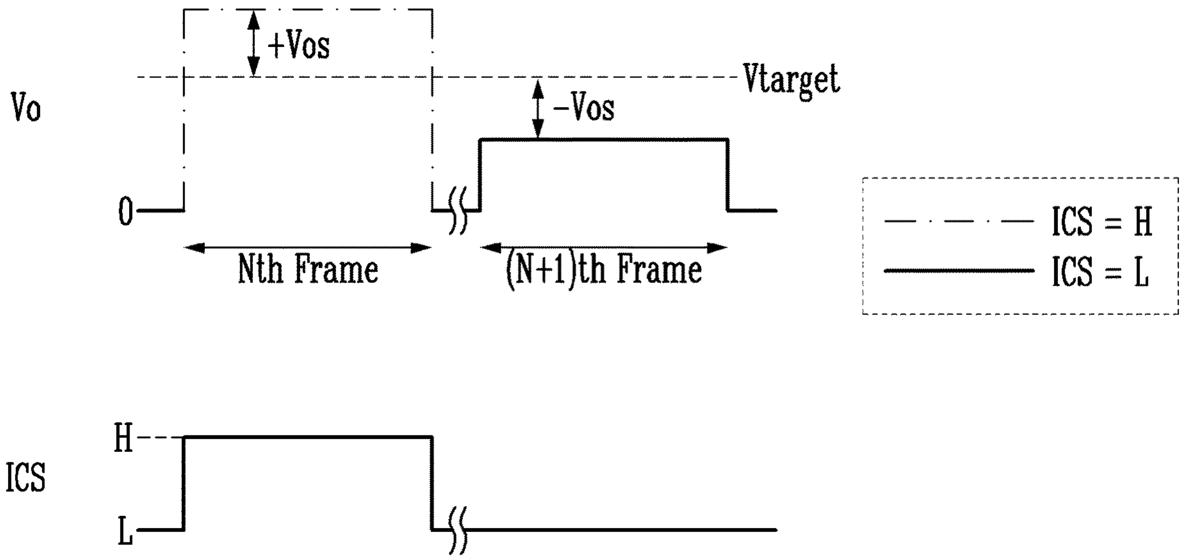
FIG. 10 is a timing diagram illustrating a relationship between an input control signal and an output voltage in accordance with embodiments of the present disclosure.

FIG. 10 is a timing diagram illustrating a relationship between the input control signal ICS and the output voltage Vo in accordance with embodiments of the present disclosure.

Referring to FIG. 10, during an N-th frame Nth Frame in which the input control signal ICS of a high logic level H is applied, the level of the output voltage Vo is the same as Vtarget+Vos. During an N+1-th frame (N+1)th Frame in which the input control signal ICS of a low logic level L is applied, the level of the output voltage Vo is the same as Vtarget−Vos.

While the frame proceeds, the user perceives the grayscale of an image as an intermediate value between the two output voltages Vtarget+Vos and Vtarget−Vos. Hence, the user may recognize the image at a grayscale close to a value indicated by the target data voltage Vtarget. Consequently, the problem of deterioration in display quality due to a bright line or a dark line, which is visible to the user, may be effectively solved.

Figure 11:
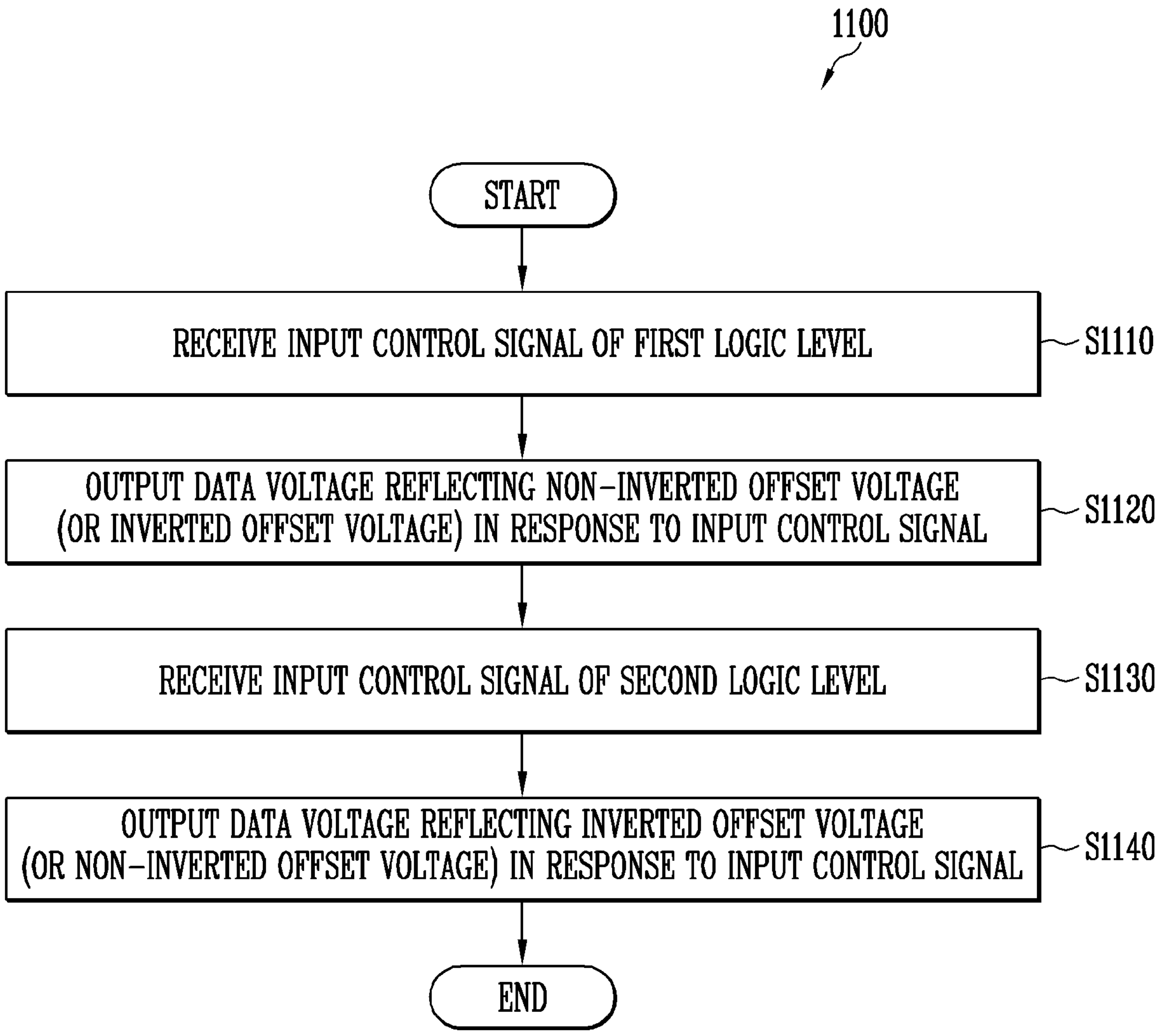
FIG. 11 is a flowchart illustrating a method of driving the display device in accordance with embodiments of the present disclosure.

FIG. 11 is a flowchart illustrating a method 1100 of driving the display device in accordance with embodiments of the present disclosure.

The method 1100 of driving the display device in accordance with embodiments of the present disclosure may include step S1110 of receiving an input control signal of a first logic level, step S1120 of outputting a data voltage reflecting an offset voltage of a non-inverted phase (or an offset voltage of an inverted phase) in response to the input control signal of the first logic level, step S1130 of receiving an input control signal of a second logic level, and step S1140 of outputting a data voltage reflecting an offset voltage of an inverted phase (or an offset voltage of a non-inverted phase) in response to the input control signal of the second logic level.

The method 1100 of driving the display device in accordance with embodiments of the present disclosure is not limited to including only the foregoing steps.

Figure 12A:
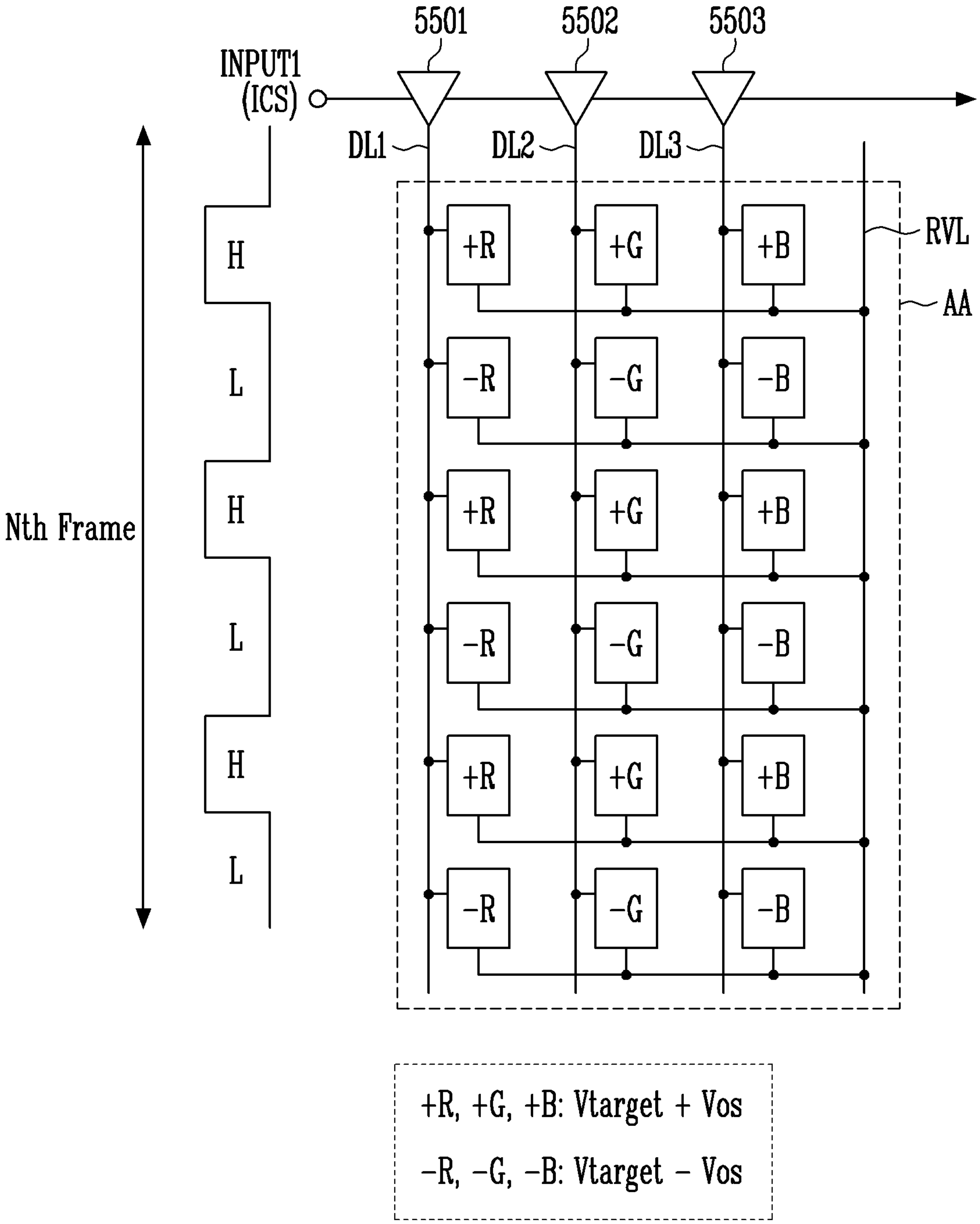
FIGS. 12A and 12B illustrate the case where the level of the input control signal makes a transition based on a single pixel row in accordance with embodiments of the present disclosure.
Figure 12B:
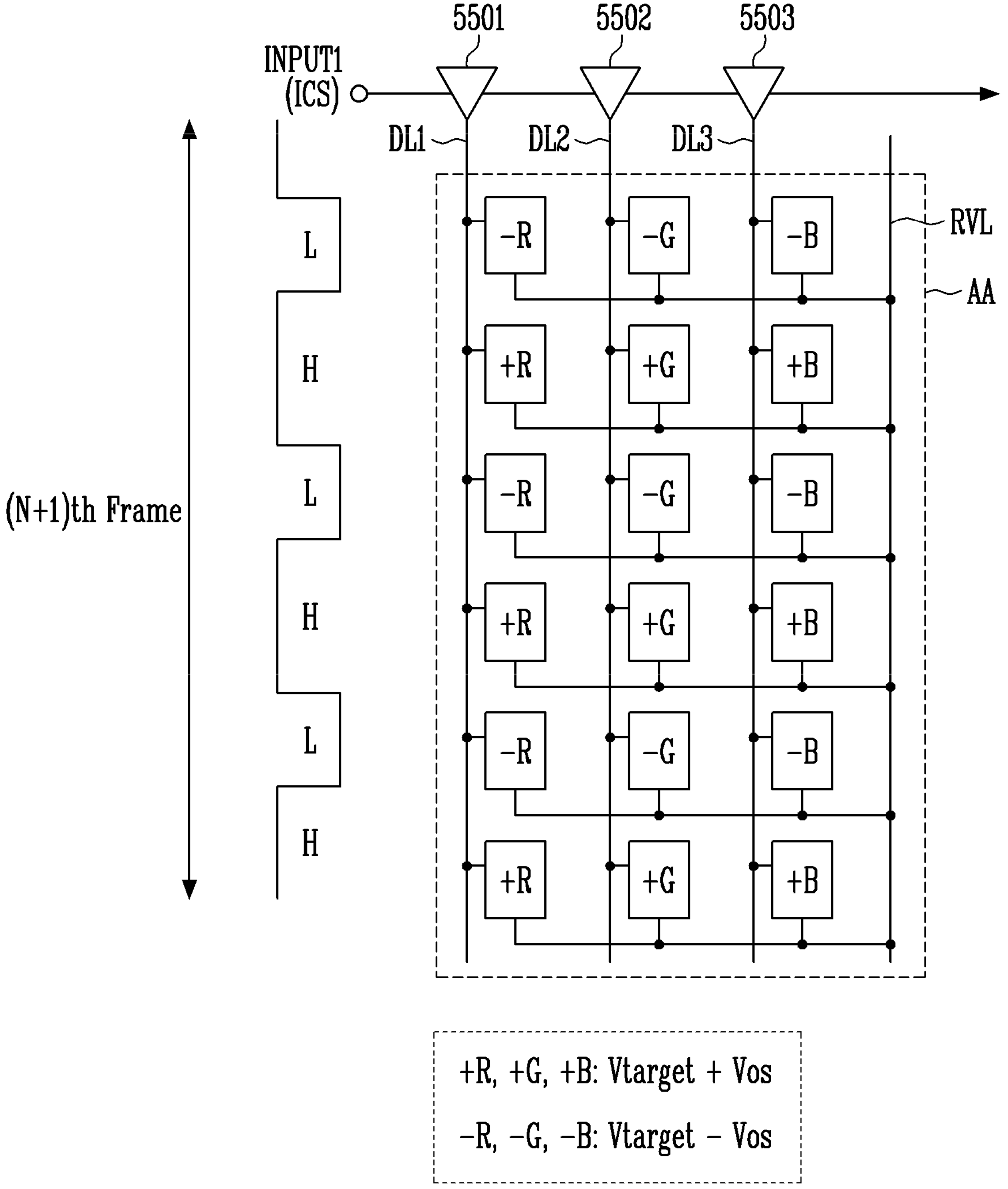

FIGS. 12A and 12B illustrate the case where the level of the input control signal ICS makes a transition based on a single pixel row in accordance with embodiments of the present disclosure.

For convenience of explanation, for example, the case where six pixel rows and one pixel column are disposed in the display area AA will be described. Each pixel row may be represented by three sub-pixels. The three sub-pixels shown in the drawings may be respectively a red sub-pixel, a green sub-pixel, and a blue sub-pixel.

A data voltage which is inputted to each sub-pixel is illustrated based on the phase of an offset voltage.

For example, +R denotes a data voltage Vtarget+Vos reflecting an offset voltage of a non-inverted phase, and indicates a data voltage inputted to the red sub-pixel. −R denotes a data voltage Vtarget−Vos reflecting an offset voltage of an inverted phase, and indicates a data voltage inputted to the red sub-pixel. +G denotes a data voltage Vtarget+Vos reflecting an offset voltage of a non-inverted phase, and indicates a data voltage inputted to the green sub-pixel. −G denotes a data voltage Vtarget−Vos reflecting an offset voltage of an inverted phase, and indicates a data voltage inputted to the green sub-pixel. +B denotes a data voltage Vtarget+Vos reflecting an offset voltage of a non-inverted phase, and indicates a data voltage inputted to the blue sub-pixel. −B denotes a data voltage Vtarget−Vos reflecting an offset voltage of an inverted phase, and indicates a data voltage inputted to the blue sub-pixel.

Referring to FIG. 12A, the first buffer-amplifier 5501 may output a data voltage to be inputted to the red sub-pixels. The second buffer-amplifier 5502 may output a data voltage to be inputted to the green sub-pixels. The third buffer-amplifier 5503 may output a data voltage to be inputted to the blue sub-pixels. The first to third buffer-amplifiers 5501, 5502, and 5503 each may output a data voltage to be inputted to sub-pixels disposed on the same pixel column.

The first to third buffer-amplifiers 5501, 5502, and 5503 may receive the same input control signal ICS. However, in some embodiments, any one of the first to third buffer-amplifiers 5501, 5502, and 5503 may receive an input control signal ICS different from that of the other buffer-amplifiers. Although for convenience of explanation the case where the first to third buffer-amplifiers 5501, 5502, and 5503 receive the same input control signal ICS will be described below by way of example, embodiments of the present disclosure are not limited thereto.

The first to third buffer-amplifiers 5501, 5502, and 5503 may output data voltages +R, +G, and +B reflecting an offset voltage of a non-inverted phase, in response to an input control signal ICS of a high logic level H. The data voltages +R, +G, and +B reflecting the offset voltage of the non-inverted phase may be inputted to the corresponding pixel (e.g., the corresponding pixel row).

The first to third buffer-amplifiers 5501, 5502, and 5503 may output data voltages −R, −G, and −B reflecting an offset voltage of an inverted phase, in response to an input control signal ICS of a low logic level L. The data voltages −R, −G, and −B reflecting the offset voltage of the inverted phase may be inputted to the corresponding pixel (e.g., the corresponding pixel row).

Referring to FIG. 12A, in one frame period (e.g., an N-th frame Nth Frame), the level of the input control signal ICS may make a transition on a pixel row basis.

For example, during a period in which the first to third buffer-amplifiers 5501, 5502, and 5503 output data voltages to be inputted to an odd-numbered (or an even-numbered) pixel row, the level of the input control signal ICS may be a high logic level H. For example, during a period in which the first to third buffer-amplifiers 5501, 5502, and 5503 output data voltages to be inputted to an even-numbered (or an odd-numbered) pixel row, the level of the input control signal ICS may be a high logic level H.

Thereby, a difference in offset voltage between spatially adjacent pixel rows may be offset (or compensated). Furthermore, the grayscale of an image may be visually recognized as a grayscale corresponding to the target data voltage Vtarget. In addition, a phenomenon in which a bright line or a dark line is visible to the user may be prevented.

Referring to FIG. 12B, as the frame proceeds, the level of the input control signal ICS may be inverted.

For example, in the N-th frame Nth Frame, during the period in which the first to third buffer-amplifiers 5501, 5502, and 5503 output data voltages to be inputted to the odd-numbered (or the even-numbered) pixel row, the level of the input control signal ICS may be a high logic level H. In the N+1-th frame (N+1)th Frame, during the period in which the first to third buffer-amplifiers 5501, 5502, and 5503 output data voltages to be inputted to the odd-numbered (or the even-numbered) pixel row, the level of the input control signal ICS may be a low logic level L.

Thereby, a difference in offset voltage between the pixel rows that are the same as each other in terms of time may be offset (or compensated). Furthermore, the grayscale of an image may be visually recognized as a grayscale corresponding to the target data voltage Vtarget. In addition, a phenomenon in which a bright line or a dark line is visible to the user may be prevented.

Figure 13A:
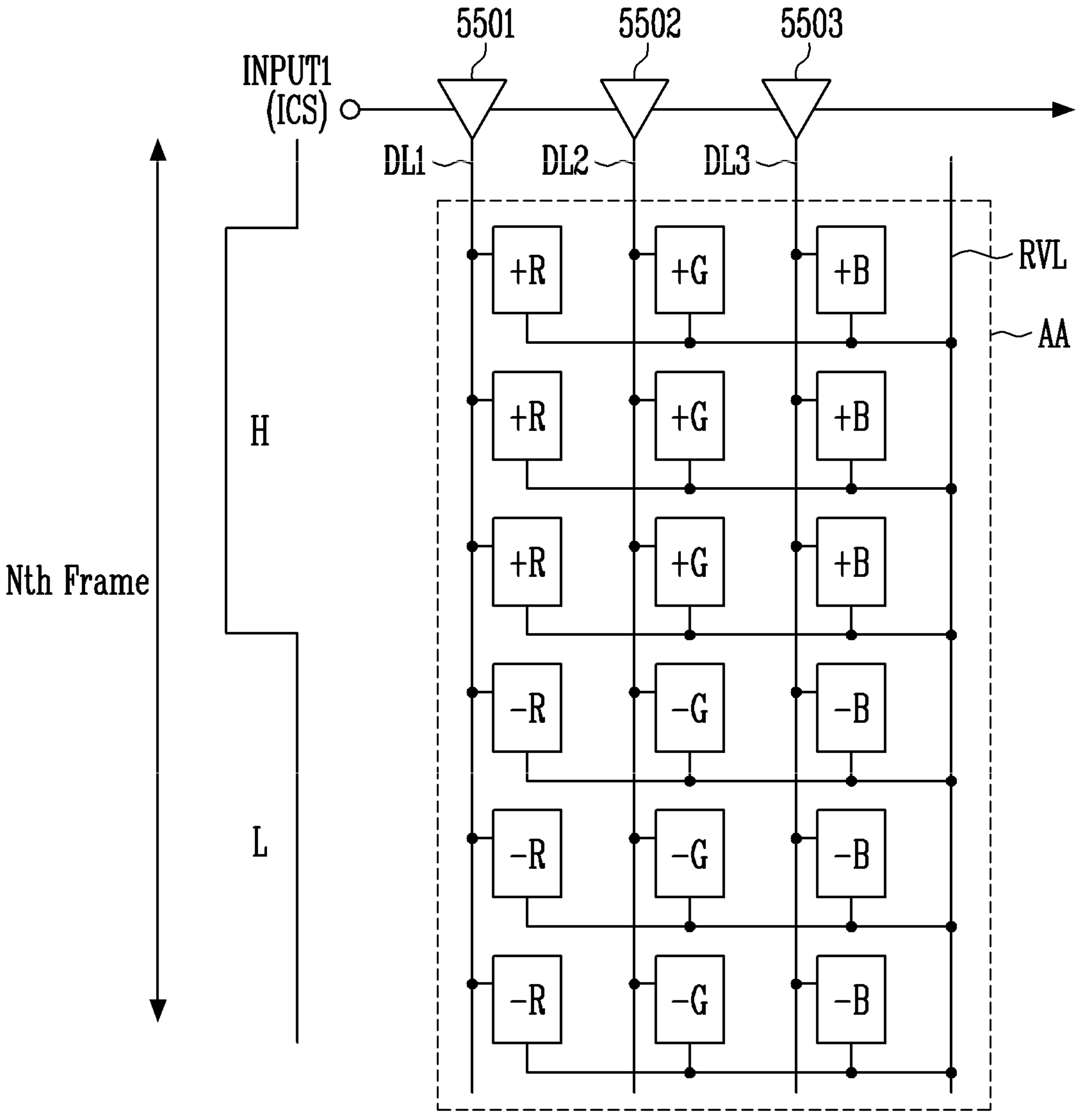
FIGS. 13A and 13B illustrate the case where the level of the input control signal makes a transition based on two or more pixel rows in accordance with embodiments of the present disclosure.
Figure 13B:
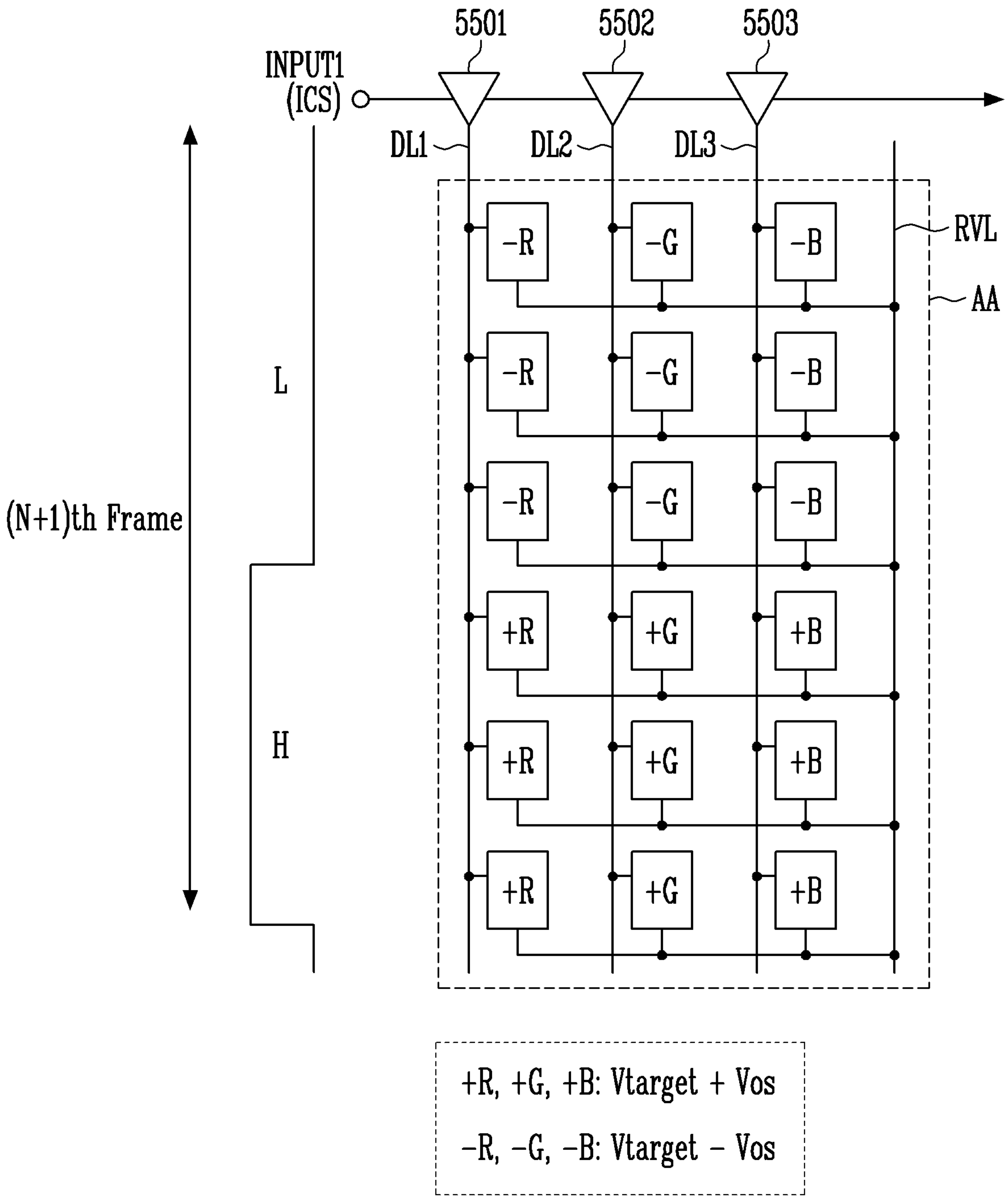

FIGS. 13A and 13B illustrate the case where the level of the input control signal ICS makes a transition based on two or more pixel rows in accordance with embodiments of the present disclosure.

Descriptions of the first to third buffer-amplifiers 5501, 5502, and 5503 and the display area AA are the same as those described with reference to FIGS. 12A and 12B; therefore, further explanation thereof will be omitted.

Referring to FIG. 13A, during a period in which the first to third buffer-amplifiers 5501, 5502, and 5503 output data voltages to be inputted to two or more pixel rows (e.g., first to third pixel rows), the level of the input control signal ICS may be a high logic level H. During a period in which the first to third buffer-amplifiers 5501, 5502, and 5503 output data voltages to be inputted to two or more pixel rows (e.g., fourth to sixth pixel rows), the level of the input control signal ICS may be a low logic level L.

Thereby, a difference in offset voltage between spatially adjacent pixel rows may be offset (or compensated). Furthermore, the grayscale of an image may be visually recognized as a grayscale corresponding to the target data voltage Vtarget. In addition, a phenomenon in which a bright line or a dark line is visible to the user may be prevented.

Referring to FIG. 13B, as the frame proceeds, the level of the input control signal ICS may be inverted.

For example, in the N-th frame Nth Frame, during the period in which the first to third buffer-amplifiers 5501, 5502, and 5503 output data voltages to be inputted to two or more pixel rows (e.g., the first to third pixel rows), the level of the input control signal ICS may be a high logic level H. In the N+1-th frame (N+1)th Frame, during the period in which the first to third buffer-amplifiers 5501, 5502, and 5503 output data voltages to be inputted to two or more pixel rows (e.g., the first to third pixel rows), the level of the input control signal ICS may be a low logic level L.

Thereby, a difference in offset voltage between the pixel rows that are the same as each other in terms of time may be offset (or compensated). Furthermore, the grayscale of an image may be visually recognized as a grayscale corresponding to the target data voltage Vtarget. In addition, a phenomenon in which a bright line or a dark line is visible to the user may be prevented.

Figure 14:
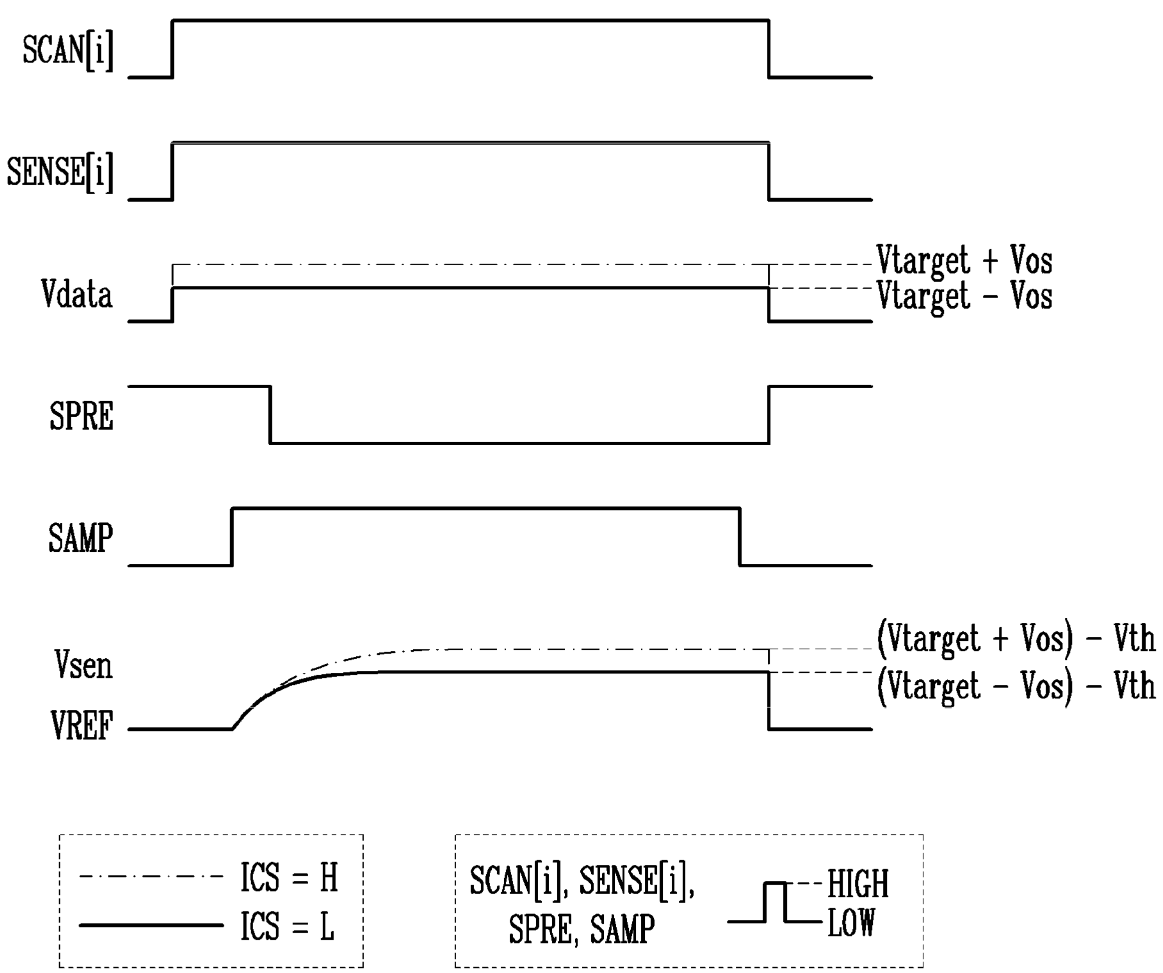
FIG. 14 is a timing diagram for describing a difference in analog sensing voltage depending on the input control signal.

FIG. 14 is a timing diagram for describing a difference in analog sensing voltage Vsen depending on the input control signal ICS.

The timing diagram illustrated in FIG. 14 may be described as a timing diagram of signals (e.g., a scan signal SCAN[i], a sensing signal SENSE[i], and a data voltage Vdata) inputted to the sub-pixel SP of FIG. 2 and signals (e.g., a reference voltage switching signal SPRE and a sampling control signal SAMP) inputted to the sensing circuit 124 of FIG. 4. Hereinafter, the timing diagram will be described with reference to FIGS. 2, 4, and 14.

The scan signal SCAN[i] and the sensing signal SENSE[i] will be described on the assumption that a high level voltage HIGH is a turn-on level voltage, and a low level voltage LOW is a turn-off level voltage. The reference voltage switching signal SPRE and the sampling control signal SAMP will be described on the assumption that a high level voltage HIGH is a turn-off level voltage, and a low level voltage LOW is a turn-on level voltage.

Referring to FIG. 14, the scan signal SCAN[i] of a turn-on level voltage and the sensing signal SENSE[i] of a turn-on level voltage are inputted to the sub-pixel SP. The data voltage Vdata is inputted to the sub-pixel SP. A voltage corresponding to the data voltage Vdata is inputted to the first node N1 of the sub-pixel SP.

The data voltage Vdata includes a certain deviation from the target data voltage Vtarget. For example, the level of the data voltage Vdata generated in response to an input control signal ICS of a high logic level H may be greater than the target data voltage Vtarget by a deviation voltage +Vos of a positive polarity. For example, the level of the data voltage Vdata generated in response to an input control signal ICS of a low logic level L may be less than the target data voltage Vtarget by a deviation voltage-Vos of a negative polarity. The deviation voltage +Vos of the positive polarity and the deviation voltage-Vos of the negative polarity are as described above with reference to Equations 5 and 8.

Referring to FIGS. 3, 4, and 14, the reference voltage VREF is applied to the second node N2 of the sub-pixel SP in response to the reference voltage switching signal SPRE of a turn-on level voltage.

Subsequently, the first switching element SW1 is turned off in response to the reference voltage switching signal SPRE of a turn-off level voltage. The second node N2 may float so that no positive voltage is applied thereto. The voltage of the second node N2 may increase from the reference voltage VREF.

The voltage of the second node N2 increases to a saturation voltage of the first transistor TR1 and then does not increase any more. The level of the saturation voltage is a value obtained by subtracting a threshold voltage Vth of the first transistor TR1 from the voltage of the first node N1.

A saturation voltage corresponding to the input control signal ICS of a high logic level H may be sensed as a first sensing voltage Vsen1 (or a first saturation voltage Vsen1). The first sensing voltage Vsen1 may be obtained from the following equation 9.

$$Vsen1=(Vtarget+Vos)-Vth \quad \text{[Equation 9]}$$

In Equation 9, Vsen1 denotes a first sensing voltage Vsen1. Vtarget denotes a target data voltage Vtarget. +Vos denotes a deviation voltage +Vos of a positive polarity. Vth denotes a threshold voltage Vth of the first transistor TR1.

A saturation voltage corresponding to the input control signal ICS of a low logic level L may be sensed as a second sensing voltage Vsen2 (or a second saturation voltage Vsen2). The second sensing voltage Vsen2 may be obtained from the following equation 10.

$$Vsen2=(Vtarget+Vos)-Vth \quad \text{[Equation 10]}$$

In Equation 10, Vsen2 denotes a second sensing voltage Vsen2. Vtarget denotes a target data voltage Vtarget. −Vos denotes a deviation voltage +Vos of a negative polarity. Vth denotes a threshold voltage Vth of the first transistor TR1.

Subsequently, the second switching element SW2 is turned on, in response to the sampling control signal SMAP of a turn-on level voltage. A value corresponding to the sensing voltage Vsen may be stored in the sensing capacitor Csen. For example, the first sensing voltage Vsen1 or the second sensing voltage Vsen2 may be stored in the sensing capacitor Csen. The analog-to-digital converter 410 may receive the value stored in the sensing capacitor Csen, and may convert the inputted value to a digital value Dsen and output the digital value Dsen.

Figure 15:
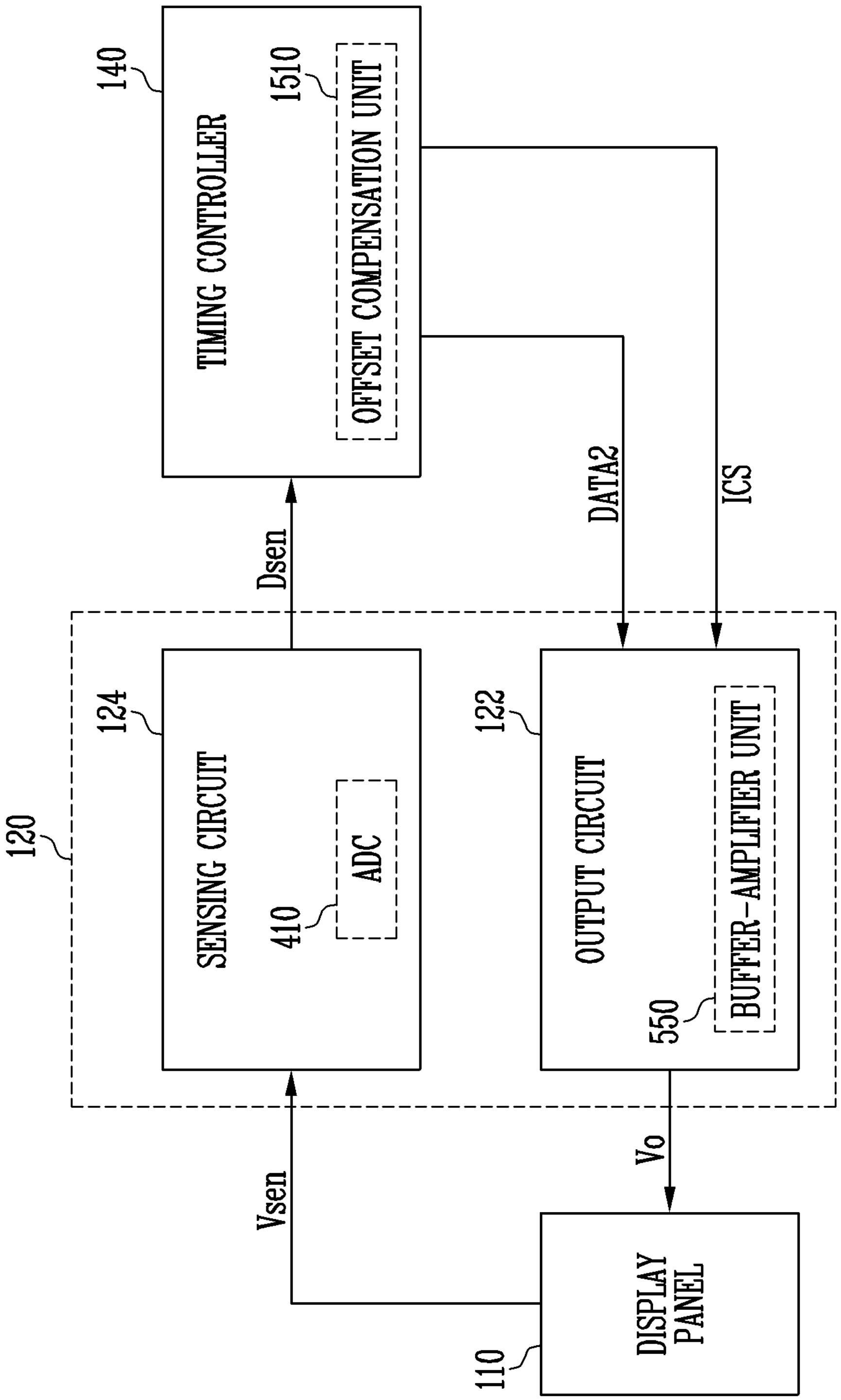
FIG. 15 is a diagram for describing an offset compensation unit in accordance with embodiments of the present disclosure.

FIG. 15 is a diagram for describing an offset compensation unit 1510 in accordance with embodiments of the present disclosure.

Referring to FIG. 15, the timing controller 140 may include an offset compensation unit 1510 configured to compensate for the offset voltage of the amplifier included in the buffer-amplifier unit 550, based on an inputted digital value Dsen.

The timing controller 140 may receive both a digital value Dsen corresponding to the first sensing voltage Vsen1 (refer to Equation 9), and a digital value Dsen corresponding to the second sensing voltage Vsen2 (refer to Equation 10).

The timing controller 140 may calculate the offset voltage Voffset of the corresponding amplifier, based on the inputted digital values Dsen. The timing controller 140 may calculate the offset voltage Voffset of the amplifier (or a value similar to the offset voltage of the amplifier) in a manner shown in the following equation 11.

[Equation 11]

$$Voffset\approx\frac{Vsen1-Vsen2}{2}=\frac{\{(Vtarget+Vos)-Vth\}-\{(Vtarget-Vos)-Vth\}}{2}=\frac{(+Vos)-(-Vos)}{2}$$

In Equation 11, Voffset denotes an offset voltage Voffset of the amplifier. Vsen1 denotes the first sensing voltage Vsen1 obtained from Equation 9. Vsen2 denotes the second sensing voltage Vsen2 obtained from Equation 10. +Vos denotes the deviation voltage +Vos of a positive polarity, obtained from Equation 5. −Vos denotes the deviation voltage −Vos of a negative polarity, obtained from Equation 8. The offset compensation unit 1510 may calculate a value corresponding to the offset voltage Voffset of the amplifier by a method shown in Equation 11, based on the pre-stored gain value Gain (refer to Equations 5 and 8) of the amplifier.

The step of compensating for the offset voltage of the buffer-amplifier unit 550 in accordance with embodiments of the present disclosure will be described below with reference to FIG. 15.

The timing controller 140 may output input image data DATA2, an input control signal ICS, and the like to the output circuit 122. The buffer-amplifier unit 550 may output, to the display panel 110, an output voltage Vo in which the offset voltage is reflected. The sensing circuit 124 may sense an analog sensing voltage Vsen according to the output voltage Vo. The analog-to-digital converter 410 may convert the sensed analog sensing voltage Vsen to a digital value Dsen corresponding thereto, and output the converted digital value Dsen. The timing controller 140 may receive both a digital value Dsen according to an input control signal ICS of a first logic level (e.g., a high logic level), and a digital value Dsen according to an input control signal ICS of a second logic level (e.g., a low logic level), and may calculate an offset voltage Voffset (refer to Equation 11) of the amplifier.

The timing controller 140 may compensate for the calculated offset voltage Voffset of the amplifier, and output input image data DATA2 reflecting the compensation value.

In an embodiment, regardless of the logic level of the input control signal ICS, a value corresponding to ½ of the calculated offset value Voffset of the amplifier may be uniformly compensated for.

In an embodiment, the logic level of the input control signal ICS may be fixed (e.g., fixed to a high logic level) regardless of a pixel row or the progress of the frame, when the calculated offset voltage Voffset of the amplifier is compensated for.

Figure 16A:
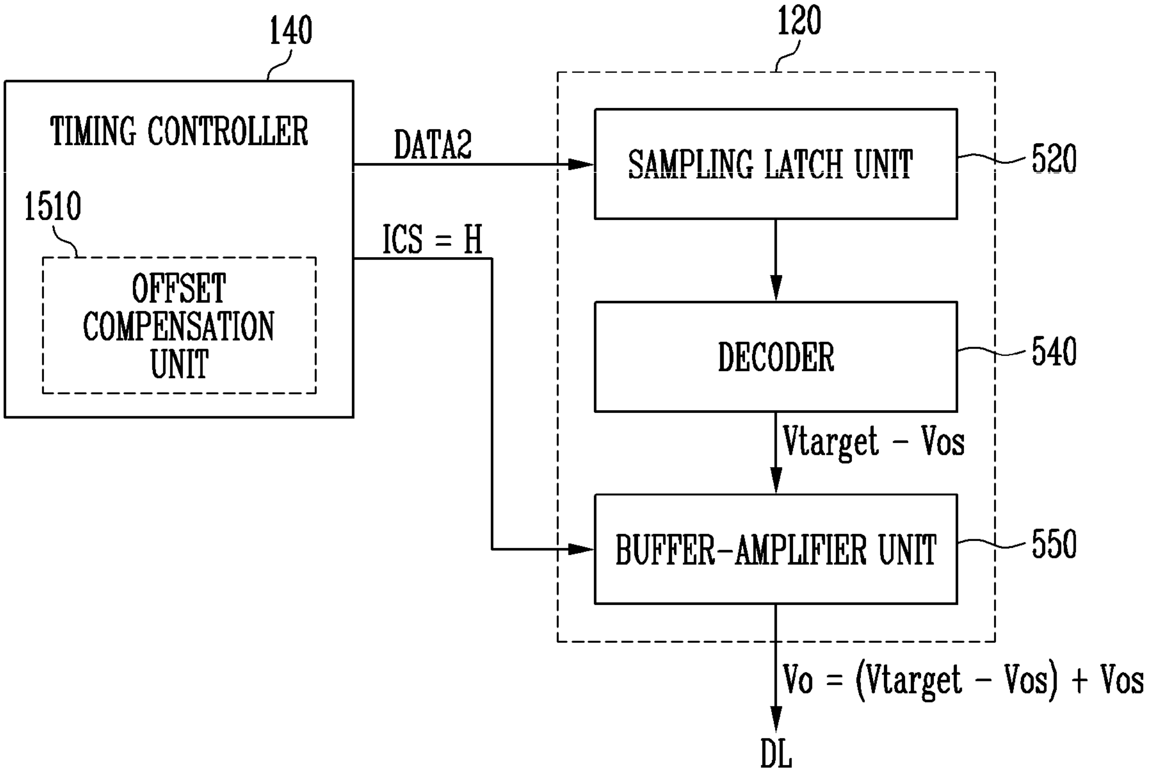
FIGS. 16A and 16B are diagrams illustrating output voltages compensated for by the offset compensation unit.
Figure 16B:
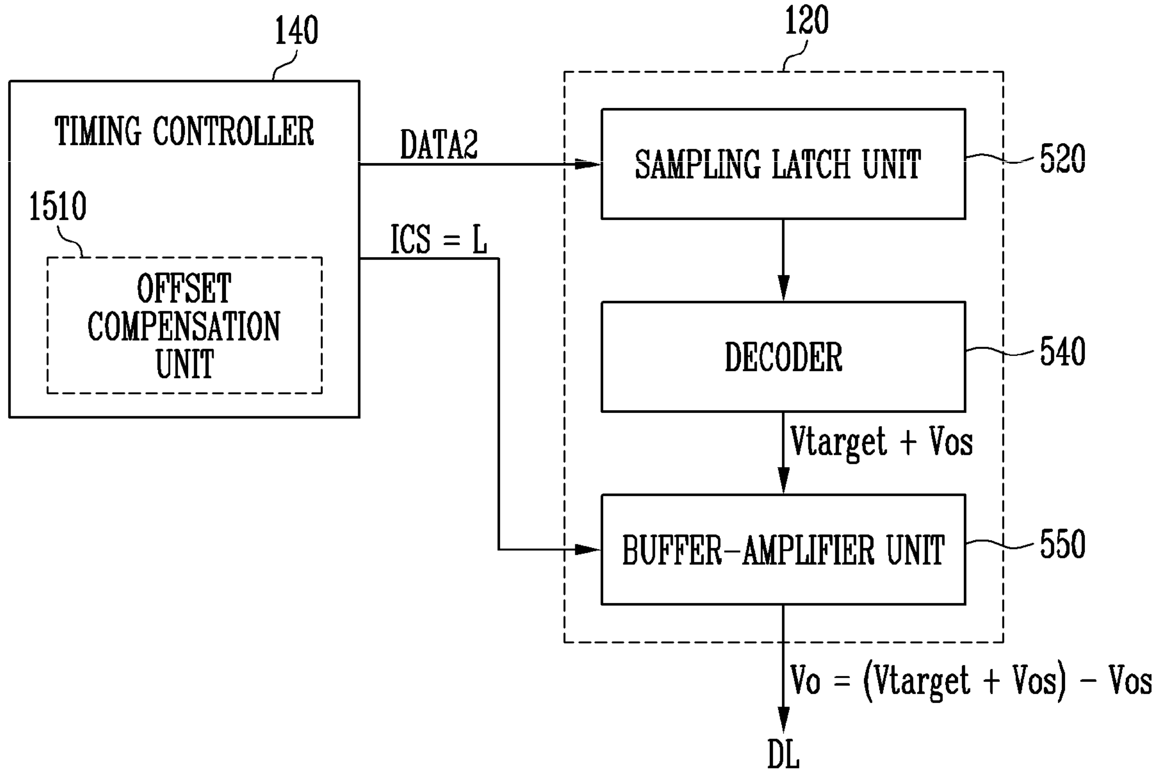

FIGS. 16A and 16B are diagrams illustrating output voltages Vo compensated for by the offset compensation unit 1510.

The offset compensation unit 1510 may calculate an offset voltage of the amplifier, and compensate for the input image data DATA2 in response to the logic level of the input control signal ICS.

For example, referring to FIG. 16A, the timing controller 140 may output an input control signal ICS of a high logic level H. The buffer-amplifier unit 550 (or the buffer-amplifier 550*j* (refer to FIGS. 8A and 8B) that forms the buffer-amplifier unit 550) may output, in response to the input control signal ICS of the high logic level H, an output voltage Vo in which a deviation voltage +Vo of a positive polarity is reflected.

The timing controller 140 may compensate for the input image data DATA2. The input image data DATA2 compensated for may be a value corresponding to a data value Vtarget−Vos obtained by compensating for the target data voltage Vtarget by a deviation voltage −Vos of a negative polarity. The output voltage Vo outputted from the buffer-amplifier unit 550 may be obtained by adding the deviation voltage +Vo of a positive polarity to the voltage Vtarget−Vos corresponding to the input image data DATA2. Thereby, the output voltage Vo may substantially converge to the target data voltage Vtarget.

For example, referring to FIG. 16B, the timing controller 140 may output an input control signal ICS of a low logic level L. The buffer-amplifier unit 550 (or the buffer-amplifier 550*j* (refer to FIGS. 8A and 8B) that forms the buffer-amplifier unit 550) may output, in response to the input control signal ICS of the low logic level L, an output voltage Vo in which a deviation voltage-Vo of a negative polarity is reflected.

The timing controller 140 may compensate for the input image data DATA2. The input image data DATA2 compensated for may be a value corresponding to a data value Vtarget+Vos obtained by compensating for the target data voltage Vtarget by a deviation voltage +Vos of a positive polarity. The output voltage Vo outputted from the buffer-amplifier unit 550 may be obtained by adding the deviation voltage −Vo of a negative polarity to the voltage Vtarget+Vos corresponding to the input image data DATA2. Thereby, the output voltage Vo may substantially converge to the target data voltage Vtarget.

Figure 17:
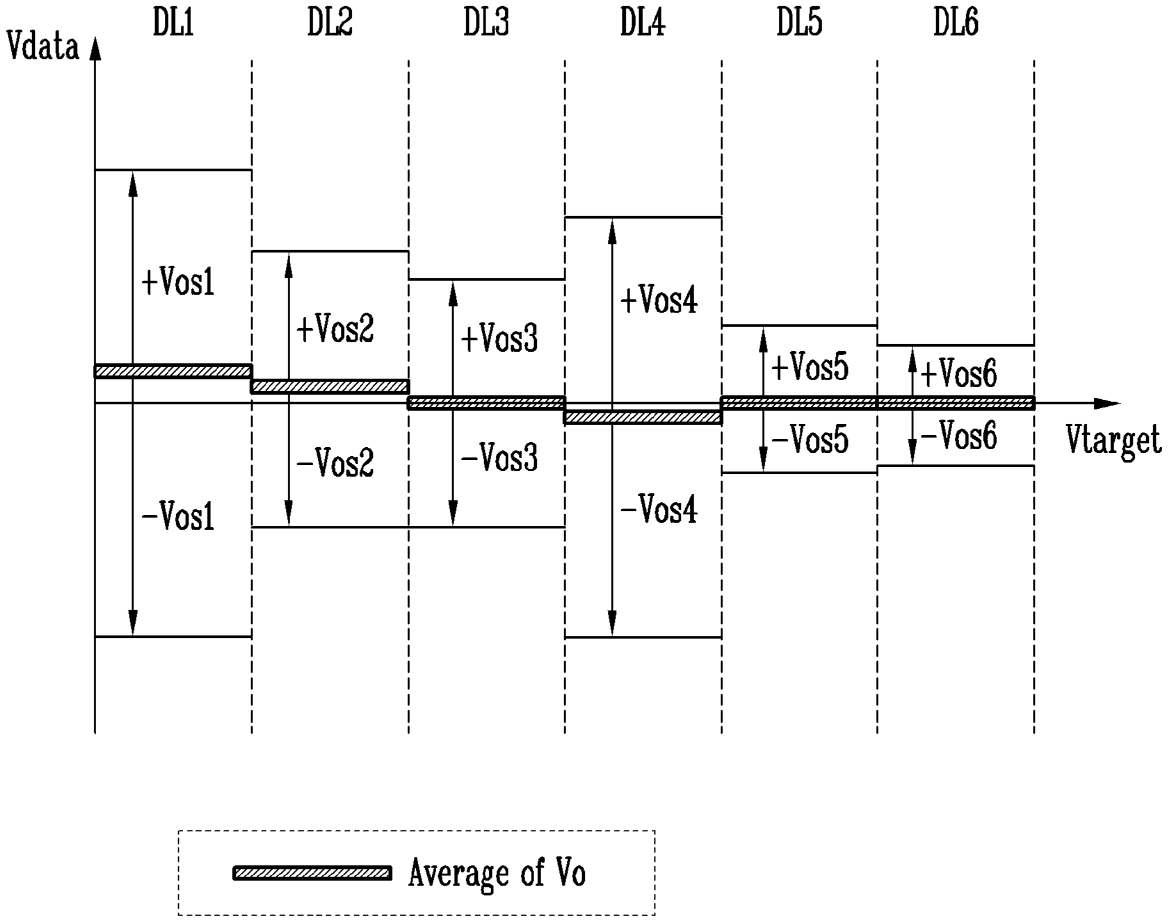
FIG. 17 is a diagram illustrating improvement in display quality in accordance with embodiments of the present disclosure.

FIG. 17 is a diagram illustrating improvement in display quality in accordance with embodiments of the present disclosure.

Referring to FIG. 17, in embodiments of the present disclosure, a data voltage Vdata including a deviation voltage +Vos of a positive polarity or a deviation voltage −Vos of a negative polarity may be outputted from each of the plurality of data lines (e.g., the first to sixth data lines DL1 to DL6). Thereby, the display device 100 (refer to FIG. 1) in accordance with embodiments of the present disclosure may display an image having a grayscale visually and/or spatially corresponding to the target data voltage Vtarget (i.e., an image having a grayscale corresponding to an average of the output voltage Vo).

Referring to FIG. 17, in embodiments of the present disclosure, a data voltage Vdata from which a deviation voltage +Vos of a positive polarity and a deviation voltage −Vos of a negative polarity is offset may be outputted. Thereby, the display device 100 (refer to FIG. 1) in accordance with embodiments of the present disclosure may display an image having improved display quality.

A data driving circuit, a display device including the data driving circuit, and a method of driving the display device in accordance with the present disclosure may enhance the display quality of a low grayscale image.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the bounds and scope of the present disclosure should be determined by the technical spirit of the following claims.

What is claimed is:

1. A data driving circuit comprising:

an amplifier having an offset voltage, and configured to output a data voltage reflecting the offset voltage;

an offset control circuit configured to control, in response to an input control signal, the amplifier to output the data voltage reflecting the offset voltage in a positive direction or a negative direction; and a sensing circuit configured to receive an analog sensing voltage, wherein the data voltage generated based on the input control signal of a first logic level is applied to a sub-pixel in an N-th frame (N is an integer of 1 or more), wherein the data voltage generated based on the input control signal of a second logic level is applied to the sub-pixel in an N+1-th frame, wherein the sensing circuit senses a first saturation voltage of a first transistor of the sub-pixel in the N-th frame, wherein the sensing circuit senses a second saturation voltage of the first transistor in the N+1-th frame, and wherein the data driving circuit outputs the sensed first saturation voltage and the sensed second saturation voltage to a timing controller to calculate the offset voltage of the amplifier.

2. The data driving circuit according to claim 1, wherein the amplifier comprises a non-inverting input terminal, an inverting input terminal, and an output terminal, and outputs the data voltage from the output terminal, wherein the offset control circuit comprises a first input terminal electrically connected to any one of the non-inverting input terminal and the inverting input terminal, and a second input terminal electrically connected to a remaining one of the non-inverting input terminal and the inverting input terminal, wherein the second input terminal of the offset control circuit is electrically connected to the output terminal, and wherein a terminal to be electrically connected to the first input terminal is switched in response to the input control signal.

3. The data driving circuit according to claim 2, further comprising:

a shift register unit including at least one shift register;

a sampling latch unit configured to latch input image data in response to a signal outputted from the shift register unit;

a holding latch unit configured to output the latched input image data in response to a source output enable signal;

a decoder configured to receive a maximum grayscale gamma voltage and a minimum grayscale gamma voltage, and select and output a grayscale voltage corresponding to the input image data outputted from the holding latch unit; and a buffer-amplifier unit configured to receive the grayscale voltage outputted from the decoder, wherein the buffer-amplifier unit comprises the amplifier and the offset control circuit.

4. The data driving circuit according to claim 3, wherein the grayscale voltage is inputted to the first input terminal.

5. The data driving circuit according to claim 2, wherein the offset control circuit comprises:

a first switching circuit configured to electrically connect the first input terminal and the non-inverting input terminal to each other, and electrically connect the second input terminal and the inverting input terminal to each other; and a second switching circuit configured to electrically connect the first input terminal and the inverting input terminal to each other, and electrically connect the second input terminal and the non-inverting input terminal to each other.

6. The data driving circuit according to claim 5, wherein the first switching circuit comprises:

a first switching element configured to electrically connect the first input terminal and the non-inverting input terminal to each other in response to the input control signal of the first logic level; and a second switching element configured to electrically connect the second input terminal and the inverting input terminal to each other in response to the input control signal of the first logic level, and wherein the second switching circuit comprises:

a third switching element configured to electrically connect the first input terminal and the inverting input terminal to each other in response to the input control signal of the second logic level; and a fourth switching element configured to electrically connect the second input terminal and the non-inverting input terminal to each other in response to the input control signal of the second logic level.

7. The data driving circuit according to claim 6, wherein the first logic level is any one of a high logic level and a low logic level, and the second logic level is a remaining one of the high logic level and the low logic level.

8. The data driving circuit according to claim 1, wherein a level of the data voltage to be outputted from the amplifier is changed depending on a level of the input control signal.

9. A display device, comprising:

a display panel in which a sub-pixel is disposed and a data line electrically connected to the sub-pixel and configured to be supplied with a data voltage is disposed;

a timing controller configured to output input image data and an input control signal; and a data driving circuit comprising an amplifier and configured to output the data voltage reflecting any one of an offset voltage of the amplifier of a positive direction and an offset voltage of the amplifier of a negative direction to a target data voltage in response to the input control signal, wherein the data driving circuit is further configured to receive an analog sensing voltage, wherein the data driving circuit applies the data voltage generated based on the input control signal of a first logic level to the sub-pixel in an N-th frame (N is an integer of 1 or more), wherein the data driving circuit applies the data voltage generated based on the input control signal of a second logic level to the sub-pixel in an N+1-th frame, wherein the data driving circuit senses a first saturation voltage of a first transistor of the sub-pixel in the N-th frame, wherein the data driving circuit senses a second saturation voltage of the first transistor in the N+1-th frame, and wherein the timing controller calculates the offset voltage of the amplifier based on the sensed first saturation voltage and the sensed second saturation voltage.

10. The display device according to claim 9, wherein the data driving circuit comprises:

the amplifier including a non-inverting input terminal, an inverting input terminal, and an output terminal; and an offset control circuit configured to control a voltage to be inputted to each of the non-inverting input terminal and the inverting input terminal in response to the input control signal.

11. The display device according to claim 10, wherein the timing controller outputs input image data corresponding to a grayscale value of an image to be displayed by the sub-pixel, and wherein the offset control circuit comprises:

a first input terminal configured to receive a voltage generated by latching the input image data; and a second input terminal configured to receive a voltage outputted from the output terminal.

12. The display device according to claim 11, wherein the timing controller outputs the input control signal of the first logic level or the second logic level, and wherein the offset control circuit further comprises:

a first switching circuit configured to electrically connect, in response to the input control signal of the first logic level, the first input terminal and the non-inverting input terminal to each other, and electrically connect the second input terminal and the inverting input terminal to each other; and a second switching circuit configured to electrically connect, in response to the input control signal of the second logic level, the first input terminal and the inverting input terminal to each other, and electrically connect the second input terminal and the non-inverting input terminal to each other.

13. The display device according to claim 9, wherein the sub-pixel comprises:

a light emitting element;

the first transistor comprising a gate electrode electrically connected to a first node, and a second electrode electrically connected to the light emitting element on a second node;

a second transistor configured to switch electrical connection between the data line and the first node;

a third transistor configured to switch electrical connection between the second node and a reference voltage line disposed in the display panel, and transmit the analog sensing voltage corresponding to a voltage of the second node to the reference voltage line; and a capacitor including a first side electrode electrically connected to the first node, and a second side electrode electrically connected to the second node.

14. The display device according to claim 13, wherein a magnitude of current flowing through the light emitting element varies depending on a level of the input control signal.

15. The display device according to claim 13, wherein, as a frame proceeds, the data voltage generated based on the input control signal of the first logic level and the data voltage generated based on the input control signal of the second logic level are alternately applied to the sub-pixel.

16. The display device according to claim 13, wherein the analog sensing voltage is a saturation voltage of the first transistor, and wherein the timing controller is configured to compensate for the offset voltage of the data driving circuit based both on a first sensing voltage according to the input control signal of the first logic level and on a second sensing voltage according to the input control signal of the second logic level.

17. A method of driving a display device, the method comprising:

outputting, by a timing controller to a data driving circuit, an input control signal of a first logic level;

outputting, by the data driving circuit to a sub-pixel, a data voltage reflecting an offset voltage of an amplifier in a non-inverted phase to a data line in response to the input control signal of the first logic level;

outputting, by the timing controller to the data driving circuit, the input control signal of a second logic level;

outputting, by the data driving circuit to the sub-pixel, a data voltage reflecting the offset voltage of the amplifier in an inverted phase to the data line in response to the input control signal of the second logic level;

applying the data voltage generated based on the input control signal of the first logic level to the sub-pixel in an N-th frame (N is an integer of 1 or more);

applying the data voltage generated based on the input control signal of the second logic level to the sub-pixel in an N+1-th frame;

sensing a first saturation voltage of a first transistor of the sub-pixel in the N-th frame;

sensing a second saturation voltage of the first transistor in the N+1-th frame; and calculating the offset voltage of the amplifier based on the sensed first saturation voltage and the sensed second saturation voltage.

18. The method according to claim 17, wherein outputting the data voltage reflecting the offset voltage of the amplifier in the non-inverted phase to the data line comprises:

electrically connecting a first input terminal configured to receive a voltage corresponding to latched input image data to a non-inverting input terminal of the amplifier; and electrically connecting an output terminal of the amplifier to an inverting input terminal of the amplifier.

19. The method according to claim 17, wherein outputting the data voltage reflecting the offset voltage of the amplifier in the inverted phase to the data line comprises:

electrically connecting a first input terminal configured to receive a voltage corresponding to latched input image data to an inverting input terminal of the amplifier; and electrically connecting an output terminal of the amplifier to a non-inverting input terminal of the amplifier.

20. The method according to claim 17, further comprising outputting input image data reflecting an inverted offset voltage or a non-inverted offset voltage depending on a level of the input control signal.

* * * * *